United States Patent
Torvinen et al.

(10) Patent No.: US 12,273,714 B2
(45) Date of Patent: *Apr. 8, 2025

(54) SECURING NETWORK STEERING INFORMATION

(71) Applicant: TELEFONAKTIEBOLAGET LM ERICSSON (PUBL), Stockholm (SE)

(72) Inventors: Vesa Torvinen, Sauvo (FI); Monica Wifvesson, Lund (SE); Ivo Sedkacek, Hovorcovice (CZ)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 18/528,662

(22) Filed: Dec. 4, 2023

(65) Prior Publication Data
US 2024/0179521 A1 May 30, 2024

Related U.S. Application Data

(63) Continuation of application No. 17/161,532, filed on Jan. 28, 2021, now Pat. No. 11,039,313, which is a
(Continued)

(51) Int. Cl.
*H04L 9/00* (2022.01)
*H04L 9/32* (2006.01)
(Continued)

(52) U.S. Cl.
CPC .......... *H04W 12/06* (2013.01); *H04L 9/3242* (2013.01); *H04W 12/10* (2013.01); *H04W 60/00* (2013.01); *H04W 84/042* (2013.01)

(58) Field of Classification Search
CPC ... H04W 84/042; H04W 60/00; H04W 12/10; H04W 12/06; H04L 9/3242
(Continued)

(56) References Cited

U.S. PATENT DOCUMENTS

| 8,356,343 | B1 | 1/2013 | Breau et al. |
| 10,524,198 | B2 | 12/2019 | Shan et al. |

(Continued)

FOREIGN PATENT DOCUMENTS

| CN | 106717044 A | 5/2017 |
| EP | 2191608 B1 | 6/2010 |

(Continued)

OTHER PUBLICATIONS

3GPP TR 25.820 V8.2.0, "3rd Generation Partnership Project; Technical Specification Group Radio Access Networks; 3G Home NodeB Study Item Technical Report (Release 8)", TR 25.820 V8.2.0, Sep. 2008.

(Continued)

*Primary Examiner* — Josnel Jeudy

(57) ABSTRACT

According to certain embodiments, a method by a user equipment (UE) for securing network steering information includes transmitting a registration request to a Visited Public Land Mobile Network (VPLMN). Upon successful authentication by an authentication server function (AUSF), a home network root key is generated. A protected message comprising Network Steering Information is received from a first network node. The protected message is protected using a configuration key (Kconf) and a first Message Authentication Code (MAC-1). The configuration key (Kconf) is determined from the home network root key, and the UE verifies the MAC-1. Based on the Kconf and the MAC-1, it is verified that the VPLMN did not alter Network Steering Information. An acknowledgement message, which is protected with a second Message Authentication Code (MAC-2), is transmitted to a Home Public Land Mobile Network (HPLMN).

27 Claims, 22 Drawing Sheets

Related U.S. Application Data continuation of application No. 16/604,875, filed as application No. PCT/EP2018/076679 on Oct. 1, 2018, now Pat. No. 11,838,754.

(60) Provisional application No. 62/566,821, filed on Oct. 2, 2017.

(51) Int. Cl.
*H04W 12/06* (2021.01)
*H04W 12/10* (2021.01)
*H04W 60/00* (2009.01)
*H04W 84/04* (2009.01)

(58) Field of Classification Search
USPC .......................................................... 726/6
See application file for complete search history.

(56) References Cited

U.S. PATENT DOCUMENTS

| | | |
|---|---|---|
| 2006/0248342 A1 | 11/2006 | Bajar et al. |
| 2006/0253703 A1 | 11/2006 | Eronen et al. |
| 2009/0052379 A1 | 2/2009 | Suh |
| 2009/0137249 A1 | 5/2009 | Horn et al. |
| 2010/0316223 A1 | 12/2010 | Blom et al. |
| 2010/0322216 A1 | 12/2010 | Roger et al. |
| 2011/0287766 A1 | 11/2011 | Carpenter |
| 2015/0195701 A1 | 7/2015 | Tuilier et al. |
| 2015/0351021 A1 | 12/2015 | Zhang et al. |
| 2016/0007268 A1 | 1/2016 | Jung et al. |
| 2016/0094988 A1 | 3/2016 | Lee et al. |
| 2016/0165428 A1 | 6/2016 | Lee et al. |
| 2016/0353361 A1 | 12/2016 | Jung et al. |
| 2017/0013510 A1 | 1/2017 | Jung et al. |
| 2017/0289888 A1 | 10/2017 | Salkintzis |
| 2018/0279397 A1 | 9/2018 | Faccin et al. |
| 2019/0149329 A1 | 5/2019 | Wu et al. |
| 2019/0182655 A1 | 6/2019 | Gupta et al. |
| 2019/0253917 A1 | 8/2019 | Dao |
| 2019/0268752 A1 | 8/2019 | Buckley et al. |
| 2020/0221281 A1* | 7/2020 | Rajadurai ............... H04W 8/06 |
| 2020/0344606 A1 | 10/2020 | Zaus et al. |
| 2020/0351966 A1 | 11/2020 | Karampatsis et al. |
| 2021/0014680 A1 | 1/2021 | Saarinen et al. |
| 2021/0029594 A1 | 1/2021 | Kunz et al. |
| 2021/0211860 A1 | 7/2021 | Rajadurai et al. |
| 2022/0417010 A1* | 12/2022 | De Kievit ............. H04L 9/3242 |

FOREIGN PATENT DOCUMENTS

| | | |
|---|---|---|
| IN | 201741025493 A | 1/2019 |
| KR | 101643999 B1 | 8/2016 |
| RU | 2466503 C2 | 10/2011 |
| WO | 2009019319 A3 | 2/2009 |
| WO | 2009038522 A1 | 3/2009 |
| WO | 2018009340 A1 | 1/2018 |

OTHER PUBLICATIONS

Ericsson, "Discussion on protection of Network Steering Information", 3GPP TSG SA WG3 (Security) Meeting #88Bis, S3-172482, Oct. 9-13, 2017, Singapore.

Qualcomm Incorporated, "Some corrections and clarification to the authentication text", 3GPP TSG SA WG3 (Security) Meeting #88, S3-172022, Aug. 7-11, 2017, Dali, China.

Samsung, "Discussion on Securing the Network Steering Information", 3GPP TSG SA WG3 (Security) Meeting #88Bis Adhoc, S3-172234, Oct. 9-13, 2017, Singapore.

Samsung, "pCR for Securing the Network Steering Information", 3GPP TSG SA WG3 (Security) Meeting #88Bis Adhoc, S3-172235, Oct. 9-13, 2017, Singapore.

Samsung, "Securing the Network Steering Information", 3GPP TSG SA WG3 (Security) Meeting #88, S3-172034, Aug. 7-11, 2017, Dali, China.

3GPP TS33.501 V15.2.0, "Technical Specification Group Services and System Aspects; Security architecture and procedures for 5G system (Release 15)", Technical Specification 33.501, Version 15.2.0, 3GPP Organizational Partners, Sep. 2018, 175 pages.

3GPP SA2, "LS on PLMN and RAT selection policies for roaming", 3GPP TSG SA WG3 (Security) Meeting #88, S3-171733, Aug. 7-11, 2017, Dali, China./ 3GPP TSG-SA WG2 Meeting #122, Tdoc S2-175286, Jun. 26-30, 2017, San Jose Del Cabo, Mexico.

3GPP TSG CT WG1, "Reply LS to LS on PLMN and RAT selection policies for roaming (S2-175286/C1-172866)", TDoc C1-173751, Aug. 21-25, 2017, Krakow, Poland.

Sa1, "LS on PLMN and RAT selection policies for roaming", 3GPP TSG-SA WG1 Meeting #79, S1-173478, Aug. 21-25, 2017, Guilin, China.

* cited by examiner

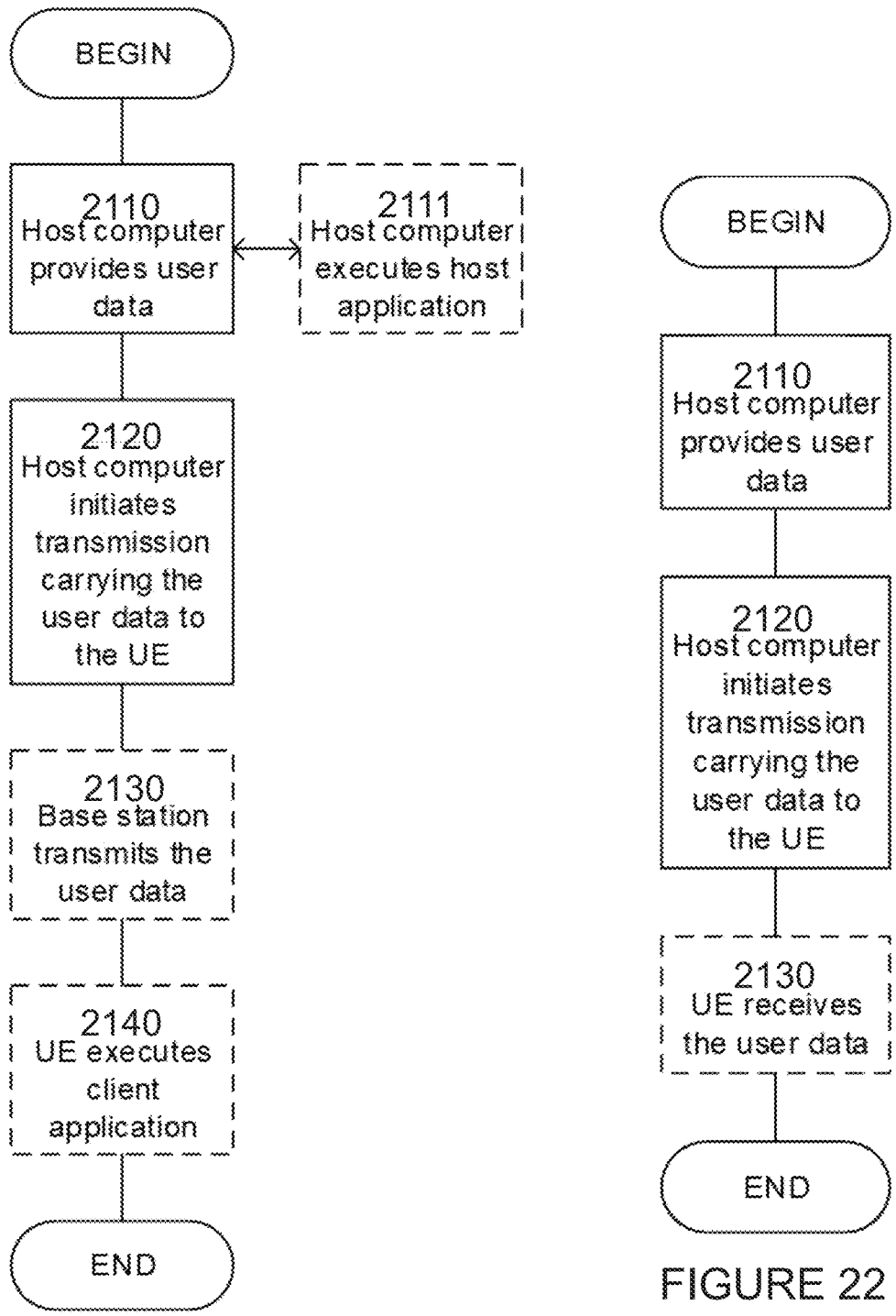

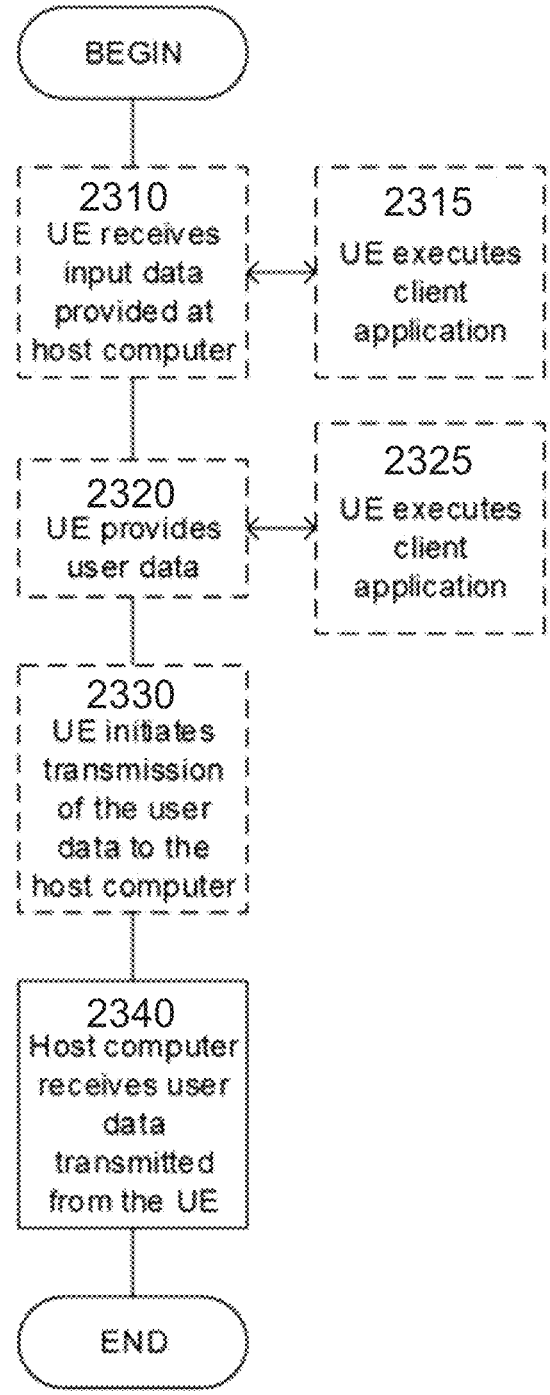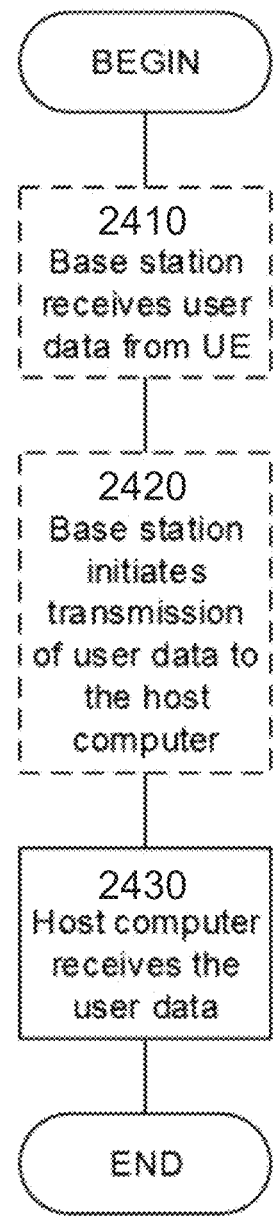
FIGURE 23
FIGURE 24

SECURING NETWORK STEERING INFORMATION

CROSS REFERENCE TO RELATED APPLICATIONS

This application is a continuation of U.S. patent application Ser. No. 17/161,532 filed Jan. 28, 2021, granted as U.S. Pat. No. 11,039,313 on Jun. 15, 2021, which is a continuation of U.S. patent application Ser. No. 16/604,875 filed Oct. 11, 2019, granted as U.S. Pat. No. 11,838,754 on Dec. 5, 2023, which is a 35 U.S.C. § 371 national stage application of PCT International Application No. PCT/EP2018/076679, filed on Oct. 1, 2018, which itself claims priority to U.S. Provisional Application No. 62/566,821 filed Oct. 2, 2017, the disclosure and content of both of which are incorporated herein by reference in their entireties.

TECHNICAL FIELD

Certain embodiments of the present disclosure relate, in general, to wireless communications and more particularly to securing network steering information.

BACKGROUND

3GPP TSG S3-171733/S2-175286 discuss LS on Public Land Mobile Network (PLMN) and Radio Access Technology (RAT) selection policies for roaming. Specifically, an LS from System Aspects Working Group 2 (SA2) was received in System Aspects Working Group 3 (SA3) #88 in 3GPP TSG S3-171733/S2-175286. The LS from SA2 in 3GPP TSG S3-171733/S2-175286 states that there is a need to define a standardized way to allow a given Home Public Land Mobile Network (HPLMN) to provide its roaming user equipments (UEs) with information about preferred networks and RAT depending on the UE current location.

SA2 submitted for consideration the following requirements in SA2 did submit for consideration the following requirements in 3GPP TSG S3-171733/S2-175286:

A control plane solution is used from the HPLMN to the UE.

Visited Public Land Mobile Network (VPLMN) is able to relay this information to the UE.

VPLMN shall not be able to alter the information sent by the HPLMN (i.e., UE should be able to check the integrity of the information provided to it.

UE should be able to detect if VPLMN altered or removed those information and act accordingly.

System Aspects Working Group 1 (SA1) replied in 3GG TSG S1-173478 with references to corresponding service requirements in TS 22.261 (subclauses 5.1.2.1 and 6.19), and TS 22.011 (subclause 3.2.2.8). SA1 requirements seem to stress that the HPLMN should be able to steer or redirect the UE for a specific VPLMN at any time.

C1-173751 discusses a reply LS to LS on PLMN and RAT selection policies for roaming. (S2-175286/C1-172866). CT1 indicated in C1-173751 that CT1 is responsible for the stage 2 specification (TS 23.122), and asks SA3 to investigate end-to-end security solution based on requirements in S3-171733/S2-175286 before CT1 specifies any solution to the requirements.

In addition, another paper in 3GPP TSG S3-172034 was submitted to SA3 #88 on the topic of securing the Network Steering Information. A related discussion paper from Samsung is in SA3 #88. Two different alternatives were discussed in 3GPP TSG S3-172034. The two potential security credentials to be considered to secure the information from the AUSF (in the HPLMN) to the UE were:

Using HN asymmetric key

Using an anchor key resulted from primary authentication.

In the conclusion in 3GPP TSG S3-172034, the second alternative (i.e., using an anchor key resulted from primary authentication) was indicated to be preferred. However, not all operators may not support a HN asymmetric key.

SUMMARY

Certain embodiments described herein address the problems of previous techniques for securing network steering information.

According to certain embodiments, a method by a user equipment (UE) for securing network steering information includes transmitting a registration request to a Visited Public Land Mobile Network (VPLMN). Upon successful authentication by an authentication server function (AUSF), a home network root key is generated. A protected message comprising Network Steering Information is received from a first network node. The protected message is protected using a configuration key (Kconf) and a first Message Authentication Code (MAC-1). The configuration key (Kconf) is determined from the home network root key, and the UE verifies the MAC-1. Based on the Kconf and the MAC-1, it is verified that the VPLMN did not alter Network Steering Information. An acknowledgement message, which is protected with a second Message Authentication Code (MAC-2), is transmitted to a Home Public Land Mobile Network (HPLMN).

According to certain embodiments, a UE comprises memory operable to store instructions and processing circuitry operable to execute the instructions to cause the UE to transmit a registration request to a VPLMN. Upon successful authentication by an AUSF, a home network root key is generated. A protected message comprising Network Steering Information is received from a first network node. The protected message is protected using a Kconf and a MAC-1. The Kconf is determined from the home network root key, and the UE verifies the MAC-1. Based on the Kconf and the MAC-1, it is verified that the VPLMN did not alter Network Steering Information. An acknowledgement message, which is protected with a second MAC-2, is transmitted to a HPLMN.

According to certain embodiments, a method for securing network steering information by a first network node operating as an AUSF includes generating a home network root key. Network Steering Information is received from a second network node, and a Kconf is determined from the home network key. A protected message comprising the Network Steering Information is generated and is protected using the Kconf and a MAC-1. The protected message comprising the Network Steering Information is transmitted to a UE. An acknowledgment message is received from the UE. The acknowledgement message is protected with a MAC-2 and indicates that the VPLMN did not alter the Network Steering Information. The acknowledgment message indicating that the VPLMN did not alter the Network Steering Information is forwarded to the second network node.

According to certain embodiments, a first network node operating as an AUSF for securing network steering information is provided. The first network node includes memory operable to store instructions and processing circuitry operable to execute the instructions to cause the network node to generate a home network root key. Network Steering Information is received from a second network node, and a Kconf is determined from the home network key. A protected message comprising the Network Steering Information is generated and is protected using the Kconf and a MAC-1. The protected message comprising the Network Steering Information is transmitted to a UE. An acknowledgment message is received from the UE. The acknowledgement message is protected with a MAC-2 and indicates that the VPLMN did not alter the Network Steering Information. The acknowledgment message indicating that the VPLMN did not alter the Network Steering Information is forwarded to the second network node.

According to certain embodiments, a method for securing network steering information by a first network node includes transmitting Network Steering Information and a MAC-1 to a second network node operating as an AUSF for protection of the Network Steering Information using a Kconf and the MAC-1. An acknowledgement message is received from the UE and is protected with a MAC-2. The acknowledgment indicates that the VPLMN did not alter the Network Steering Information. The MAC-2 is verified and it is determined, based on the acknowledgement, that the VPLMN did not alter the Network Steering Information.

According to certain embodiments, a first network node is provided for securing network steering information. The network node comprises memory operable to store instructions and processing circuitry operable to execute the instructions to cause the network node to transmit Network Steering Information and a MAC-1 to a second network node operating as an AUSF for protection of the Network Steering Information using a Kconf and the MAC-1. An acknowledgement message is received from the UE and is protected with a MAC-2. The acknowledgment indicates that the VPLMN did not alter the Network Steering Information. The MAC-2 is verified and it is determined, based on the acknowledgement, that the VPLMN did not alter the Network Steering Information.

Embodiments of the present disclosure may provide one or more technical advantages. As an example, an advantage of certain embodiments may provide an end-to-end solution, in which a node in the HPLMN, such as for example the AUSF, may send an integrity protected Network Steering Information to the UE. Another advantage may be that the solution is derived from the primary authentication of the HPLMN, using a key that is known only by the UE and the HPLMN. As another example, an advantage may be that the solution may be enhanced with end-to-end encryption such that the Network Steering Information may be hidden from the VPLMN. Still another advantage may be that certain embodiments provide acknowledgement of receipt of Network Steering Information by the UE such that the HPLMN knows if the UE received the information.

Certain embodiments may include none, some, or all of these advantages. Certain embodiments may include other advantages, as would be understood by a person having ordinary skill in the art.

BRIEF DESCRIPTION OF THE DRAWINGS

FIG. 21 is a flowchart illustrating a method implemented in a communication system, in accordance with certain embodiments.

FIG. 22 is a flowchart illustrating a method implemented in a communication system, in accordance with certain embodiments.

FIG. 23 is a flowchart illustrating a method implemented in a communication system, in accordance with certain embodiments.

FIG. 24 is a flowchart illustrating a method implemented in a communication system, in accordance with certain embodiments.

DETAILED DESCRIPTION

Figure 1:
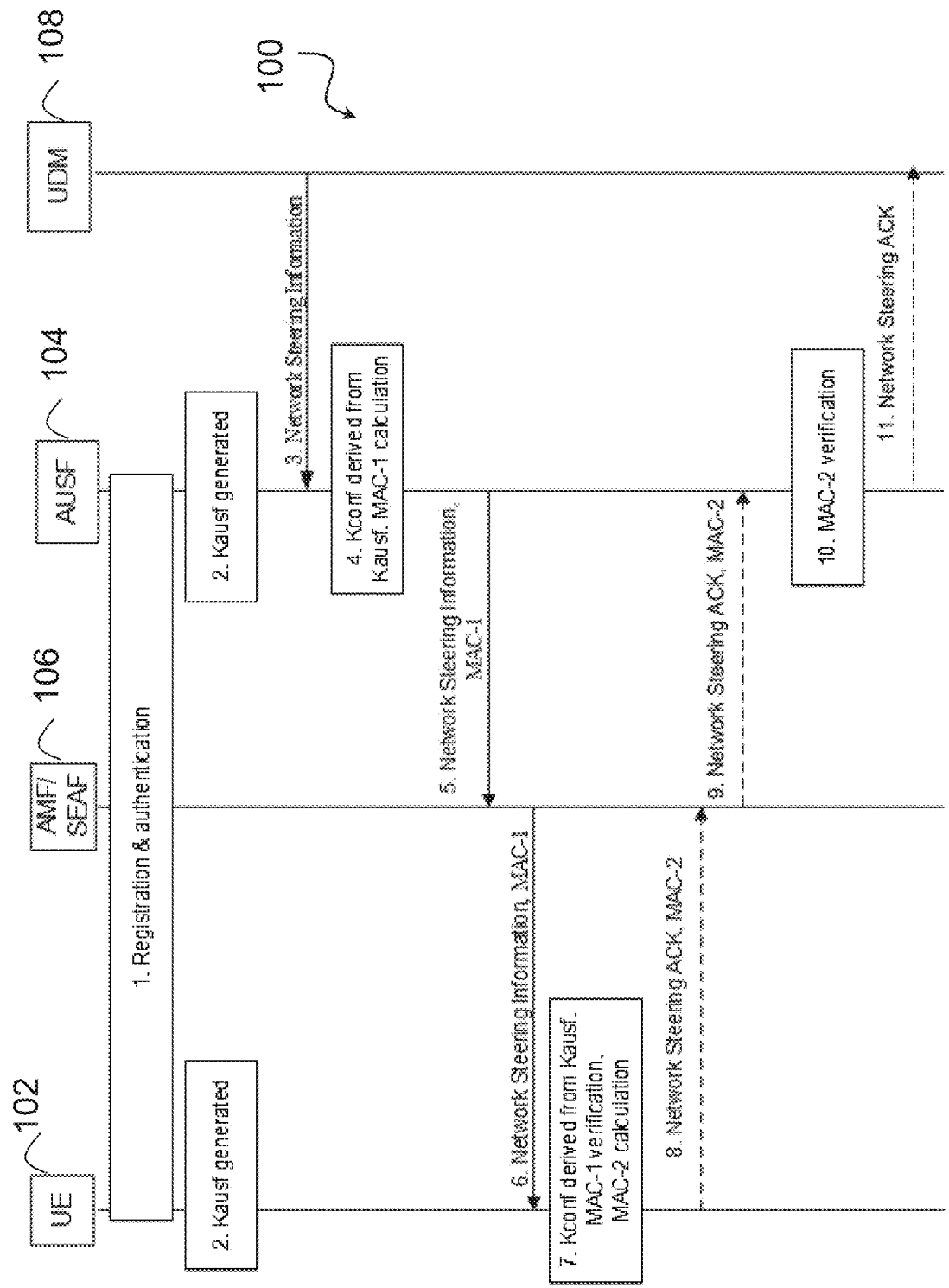
FIG. 1 illustrates an example signaling flow demonstrating provisioning of the Network Steering Information from an HPLMN to a UE, according to certain embodiments.

According to certain embodiments, an end-to-end solution is provided, in which a node in the Home Public Land Mobile Network (HPLMN) such as, for example, an authentication server function (AUSF) may send integrity protected Network Steering Information to the user equipment (UE). In a particular embodiment, the solution is based on the Kausf, derived from the primary authentication. This key would be known only by the UE and the HPLMN. Thus, a key may be derived from Kausf resulted from primary authentication is used to secure the Network Steering Information from the Home Public Land Mobile Network (HPLMN) to the user equipment (UE). In a particular embodiment, the key is a configuration key and the Network Steering Information is a preferred Public Land Mobile Network (PLMN) and Radio Access Technology (RAT) list. Specifically, according to certain embodiments, the AUSF in the HPLMN calculates a message authentication code over the Network Steering Information using this configuration key.

In a particular embodiment, the solution may be enhanced with end-to-end encryption. An advantage of encryption may be that the Network Steering Information may be hidden from the Visited Public Land Mobile Network (VPLMN). Additionally, confidentiality protection over the air interface may be achieved by Non Access Stratum (NAS) security. However, the usage of any form of confidentiality protection may be subject to regional or national regulatory policies.

UE detection of removal of Network Steering Information by the VPLMN is a challenge. Accordingly, certain embodiments provided herein, propose the usage of acknowledge message back to the HPLMN so that at least HPLMN knows if the UE received the information. For example, a UE may send an acknowledge message when it has received the Network Steering Information. In a particular embodiment, the acknowledge message may be integrity protected by the UE. Specifically, a Network Steering acknowledgement (ACK) is protected end-to-end between UE and a node in the HPLMN. Upon receipt of the Network Steering ACK, the HPLMN may know if the VPLMN delivered the message. It is noted that the Network Steering information may re-direct the UE to another VPLMN, and consequently the VPLMN may not have interest to deliver it.

According to certain particular embodiments, some additional potential parameters considered include:
  Configuration key identifier: This identifier may tie the configuration key to the Kausf from which it has been derived. In a particular embodiment, for example, the configuration key identifier may be the random challenge (RAND) generated by the AUSF and issued to the MS.
  Integrity protection algorithm identifier: In a particular embodiment, if the integrity algorithm is not identified separately, it may be the well-known KDF function typically used in 3GPP networks, i.e., HMAC-SHA-256 (cf. 3GPP TS 33.401 Annex A, and TGPP TS 33.220 Annex B).
  Counter: If the same configuration key is used to calculate more than one medium access control (MAC), then an additional counter is preferred as a parameter for detecting replay protection in the UE.

FIG. 1 illustrates an example signaling flow 100 demonstrating provisioning of the Network Steering Information from HPLMN to the UE 102, according to certain embodiments. More specifically, FIG. 1 demonstrates an example of the UE Registration procedure when the AUSF 104 in the home network performs the integrity protection of the Network Steering Information and includes the security protected Network Steering Information over the N12 interface to the Access Mobility Function/Security Anchor Function (AMF/SEAF) 106 in the Visited Public Land Mobile Network (VPLMN). The AMF/SEAF 106 sends the protected Network Steering Information to the UE 102 in a Non Access Stratum (NAS) message. In a particular embodiment, for example, the AMF/SEAF 106 sends the protected Network Steering Information to the UE 102 in a Registration Accept message. It is noted that the example provided is an example optimization. In a particular embodiment, the HPLMN should be able to send the Network Steering Information at any time to the UE 102. Thus, the HPLMN may not be limited to sending the Network Steering Information to the UE 102 only during Registration procedure.

As depicted in FIG. 1, the signaling flow according to certain embodiments is:
  1. The UE 102 registers to the VPLMN and is authenticated by AUSF 104.
  2. The UE 102 and AUSF 104 generate Kausf.
  3. A node in the HPLMN (e.g. User Data Management (UDM) 108) sends the Network Steering Information to AUSF 104. In the depicted embodiment, the AUSF 104 protects the Network Steering Information. However, some other node could protect the Network Steering Information. For example, the Policy Control Function could protect the Network Steering Information, in a particular embodiment.
  4. The AUSF 104 derives the configuration key (Kconf) from the home network root key (Kausf) and calculates the Message Authentication Code (MAC-1) over Network Steering Information.
  5. The AUSF 104 forwards the protected Network Steering Information to AMF/SEAF.
  6. The AMF/SEAF forwards the protected Network Steering Information to the UE 102. In a particular embodiment, this message could be confidentiality protected over the air with NAS security. In a particular embodiment, the Network Steering Information could be piggybacked such as, for example, in a Registration Accept message.
  7. The UE 102 derives the configuration key (Kconf) from the home network root key (Kausf) and verifies the MAC-1. In a particular embodiment, the UE 102 may send an acknowledgement message ("Network Steering ACK") to the HPLMN and protect that information with the MAC-2.
  8. The UE 102 sends the protected ACK message to the AMF/SEAF.
  9. The AMF/SEAF forwards the protected ACK to the AUSF.
  10. AUSF verifies the MAC-2 in the protected Network Steering ACK message.
  11. AUSF forwards the ACK to the original source of the Network Steering Information.

Figure 2:
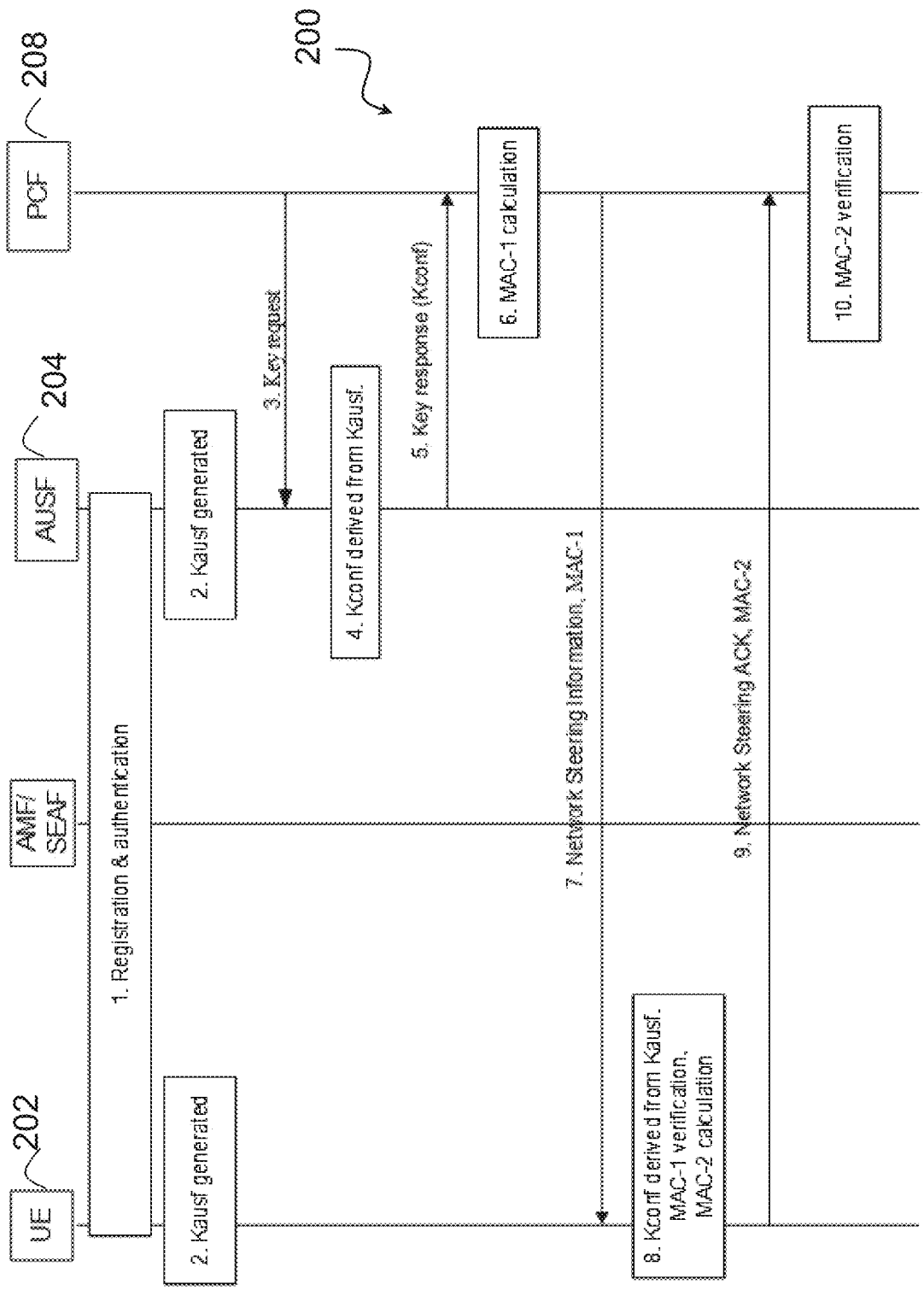
FIG. 2 illustrates an example signaling flow showing provisioning of the Network Steering Information from an HPLMN to a UE, according to certain embodiments.

FIG. 2 illustrates another example signaling flow 200 showing provisioning of the Network Steering Information from the HPLMN to the UE 202, according to certain embodiments. More specifically, FIG. 2 demonstrates a scenario when a node other than AUSF 204 is in charge of delivering the Network Steering Information. For example, in the depicted embodiment, the Point Coordination Function (PCF) 208 delivers the Network Steering Information. The PCF 208 is just one example, however, and the Network Steering Information may be delivered by another node in other embodiments.

As depicted in FIG. 2, the signaling flow 200 according to certain embodiments is:
1. The UE 202 registers to the VPLMN, and is authenticated by the AUSF 204.
2. The UE 202 and AUSF 204 generate Kausf.
3. A node in the HPLMN sends a key request to the AUSF 204. In the depicted example embodiment, the PCF 208 sends the key request to the AUSF 204. According to a particular embodiment, it may be assumed that the AUSF 204 only derives further keys from the home network root key (Kausf) and acts as an key management server and distributes such keys in HPLMN.
4. The AUSF 204 derives the configuration key (Kconf) from the home network root key (Kausf).
5. The AUSF 204 sends the Key response with the configuration key (Kconf) to the PCF 208.
6. The PCF 208 constructs the Network Steering Information, and protects it with MAC-1.
7. The PCF 208 sends the protected Network Steering Information to the UE 202. According to particular embodiments, there may be intermediate nodes between the PCF 208 and the UE 202, which may receive and forward the protected Network Steering Information, in certain embodiments.
8. The UE derives the configuration key (Kconf) from the home network root key (Kausf) and verifies the MAC-1. In a particular embodiment, the UE 202 may send an acknowledgement message ("Network Steering ACK") to the PCF 208 and protect that information with the MAC-2.
9. The UE 202 sends the protected ACK message to the PCF 208. According to particular embodiments, there may be intermediate nodes between the node and the UE 202.
10. The PCF 208 verifies the MAC-2 in the protected Network Steering ACK message.

UE 202 detection of the removal of Network Steering Information by a VPLMN is difficult. This may require that the UE 202 is able to expect such message to arrive, and AUSF 204 would send the message (with the MAC) even when nothing needs to be configured. Such a messaging scheme may not be efficient and would not guarantee the delivery at any time but only when the UE 202 expects them to arrive. As such, according to certain embodiments, the use of the acknowledge message back to the HPLMN is proposed so that at least HPLMN is able to detect the failure of delivery.

Figure 3:
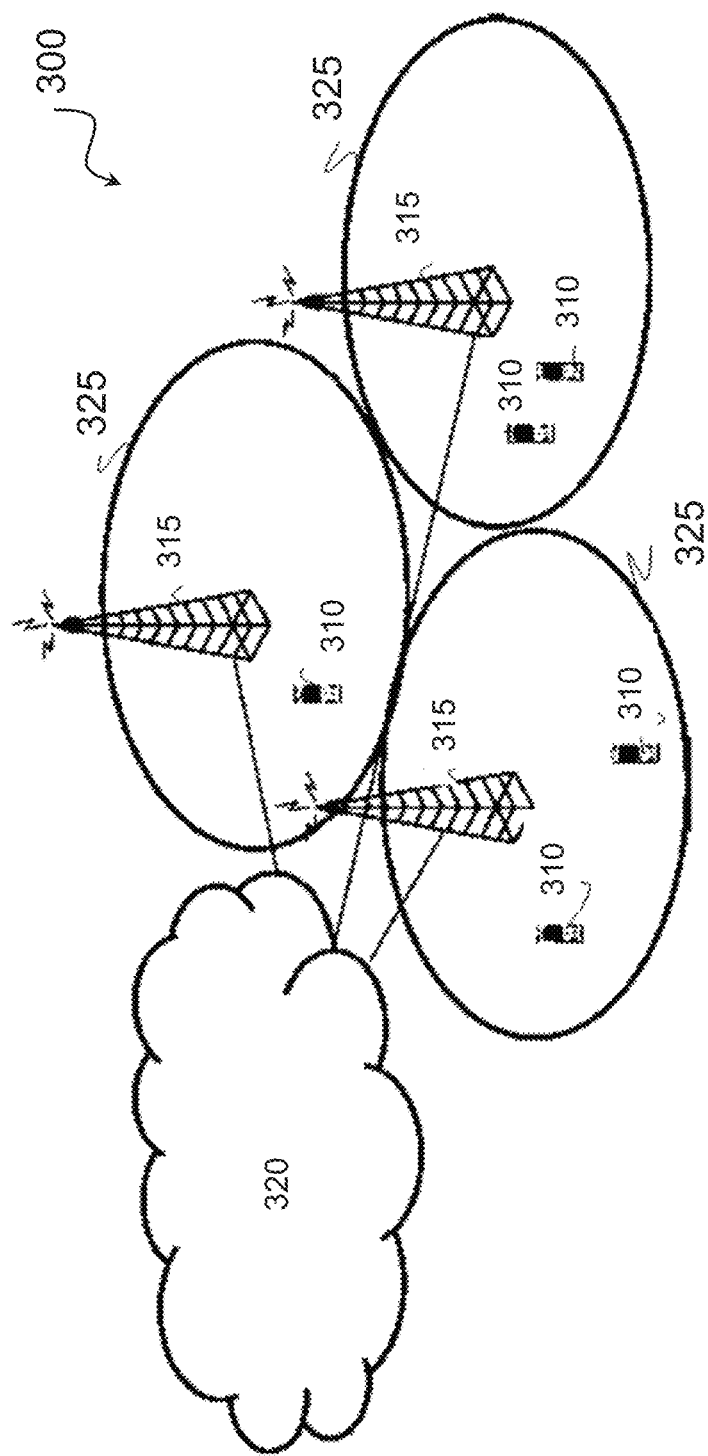
FIG. 3 illustrates an example embodiment of a network retransmission scheme for securing network steering information, in accordance with certain embodiments.

FIG. 3 illustrates an example embodiment of a network 300 retransmission scheme for securing network steering information, in accordance with certain embodiments. Network 300 includes one or more UE(s) 310 (which may be interchangeably referred to as wireless devices 310) and one or more network node(s) 315 (which may be interchangeably referred to as gNBs 315). UEs 310 may communicate with network nodes 315 over a wireless interface. For example, a UE 310 may transmit wireless signals to one or more of network nodes 315, and/or receive wireless signals from one or more of network nodes 315. The wireless signals may contain voice traffic, data traffic, control signals, and/or any other suitable information. In some embodiments, an area of wireless signal coverage associated with a network node 315 may be referred to as a cell 325. In some embodiments, UEs 310 may have device-to-device (D2D) capability. Thus, UEs 310 may be able to receive signals from and/or transmit signals directly to another UE.

In certain embodiments, network nodes 315 may interface with a radio network controller. The radio network controller may control network nodes 315 and may provide certain radio resource management functions, mobility management functions, and/or other suitable functions. In certain embodiments, the functions of the radio network controller may be included in network node 315. The radio network controller may interface with a core network node. In certain embodiments, the radio network controller may interface with the core network node via an interconnecting network 320. Interconnecting network 320 may refer to any interconnecting system capable of transmitting audio, video, signals, data, messages, or any combination of the preceding. Interconnecting network 320 may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In some embodiments, the core network node may manage the establishment of communication sessions and various other functionalities for UEs 310. UEs 310 may exchange certain signals with the core network node using the non-access stratum (NAS) layer. In non-access stratum signaling, signals between UEs 310 and the core network node may be transparently passed through the radio access network. In certain embodiments, network nodes 315 may interface with one or more network nodes over an internode interface.

As described above, example embodiments of network 300 may include one or more wireless devices 310, and one or more different types of network nodes capable of communicating (directly or indirectly) with wireless devices 310.

In some embodiments, the non-limiting term UE is used. UEs 310 described herein can be any type of wireless device capable of communicating with network nodes 315 or another UE over radio signals. UE 310 may also be a radio communication device, target device, D2D UE, NB-IoT device, MTC UE or UE capable of machine-to-machine communication (M2M), low-cost and/or low-complexity UE, a sensor equipped with UE, Tablet, mobile terminals, smart phone, laptop embedded equipped (LEE), laptop mounted equipment (LME), USB dongles, Customer Premises Equipment (CPE), etc.

Also, in some embodiments, generic terminology "radio network node" (or simply "network node") is used. It can be any kind of network node, which may comprise a gNB, base station (BS), radio base station, Node B, base station (BS), multi-standard radio (MSR) radio node such as MSR BS, evolved Node B (eNB), network controller, radio network controller (RNC), base station controller (BSC), relay node, relay donor node controlling relay, base transceiver station (BTS), access point (AP), radio access point, transmission points, transmission nodes, Remote Radio Unit (RRU), Remote Radio Head (RRH), nodes in distributed antenna system (DAS), Multi-cell/multicast Coordination Entity (MCE), core network node (e.g., MSC, MME, etc.), O&M, OSS, SON, positioning node (e.g., E-SMLC), MDT, or any other suitable network node.

The terminology such as network node and UE should be considered non-limiting and, in particular, does not imply a certain hierarchical relation between the two; in general, "eNodeB" could be considered as device 1 and "UE" device 2, and these two devices communicate with each other over some radio channel.

Example embodiments of UE 310, network nodes 315, and other network nodes (such as radio network controller or core network node) are described in more detail below.

Although FIG. 3 illustrates a particular arrangement of network 300, the present disclosure contemplates that the various embodiments described herein may be applied to a variety of networks having any suitable configuration. For example, network 300 may include any suitable number of UEs 310 and network nodes 315, as well as any additional elements suitable to support communication between UEs or between a UE and another communication device (such as a landline telephone). Furthermore, although certain embodiments may be described as implemented in an NR or 5G network, the embodiments may be implemented in any appropriate type of telecommunication system supporting any suitable communication and using any suitable components, and are applicable to any radio access technology (RAT) or multi-RAT systems in which a UE receives and/or transmits signals (e.g., data). For example, the various embodiments described herein may be applicable to IoT, NB-IoT, LTE, LTE-Advanced, UMTS, HSPA, GSM, cdma2000, WCDMA, WiMax, UMB, WiFi, another suitable radio access technology, or any suitable combination of one or more radio access technologies.

Figure 4:
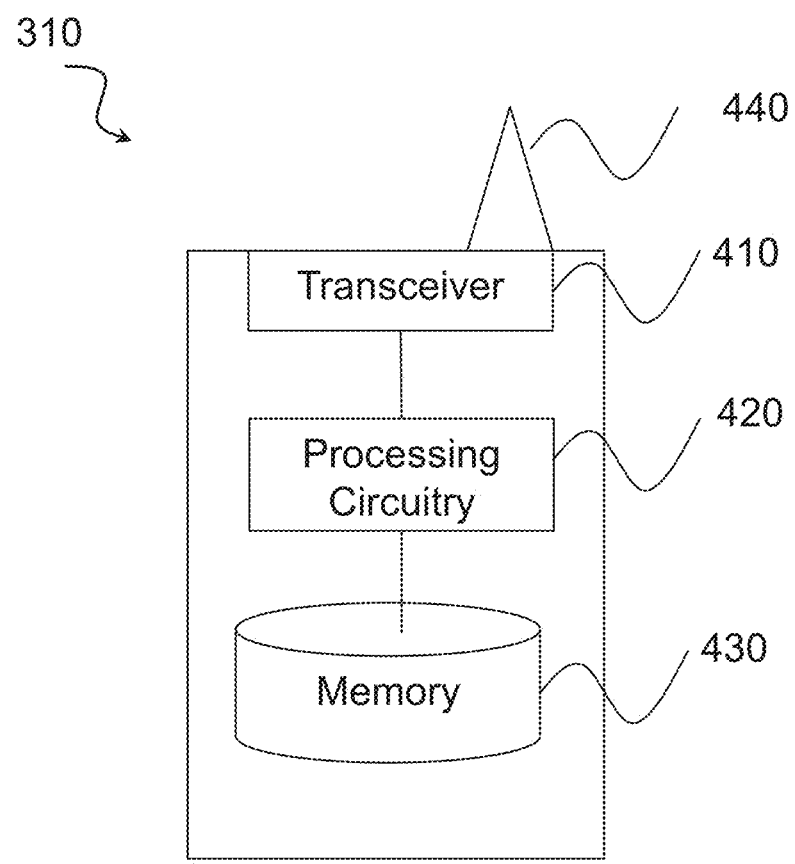
FIG. 4 illustrates an example wireless device for securing network steering information, in accordance with certain embodiments.

FIG. 4 illustrates an example wireless device 310 for securing network steering information, in accordance with certain embodiments. Wireless device 310 may refer to any type of wireless device communicating with a node and/or with another wireless device in a cellular or mobile communication system. Examples of wireless device 310 include a mobile phone, a smart phone, a PDA (Personal Digital Assistant), a portable computer (e.g., laptop, tablet), a sensor, a modem, an MTC device/machine-to-machine (M2M) device, laptop embedded equipment (LEE), laptop mounted equipment (LME), USB dongles, a D2D capable device, or another device that can provide wireless communication. A wireless device 310 may also be referred to as UE, a station (STA), a device, or a terminal in some embodiments. Wireless device 310 includes transceiver 410, processing circuitry 420, and memory 430. In some embodiments, transceiver 410 facilitates transmitting wireless signals to and receiving wireless signals from network node 315 (e.g., via antenna 440), processing circuitry 420 (e.g., which may include one or more processors) executes instructions to provide some or all of the functionality described above as being provided by wireless device 310, and memory 430 stores the instructions executed by processing circuitry 420.

Processing circuitry 420 may include any suitable combination of hardware and software implemented in one or more modules to execute instructions and manipulate data to perform some or all of the described functions of wireless device 310, such as the functions of UE 310 (i.e., wireless device 310) described in relation to any of sections 3, 4, and 6 herein. For example, in general, processing circuitry may save a current version of system information and/or apply a previously stored version of system information based on a system information notification (e.g., system information change notification, system information modification, or system information update) received in a paging message from a network node 315. In some embodiments, processing circuitry 420 may include, for example, one or more computers, one or more central processing units (CPUs), one or more microprocessors, one or more applications, one or more application specific integrated circuits (ASICs), one or more field programmable gate arrays (FPGAs) and/or other logic.

Memory 430 is generally operable to store instructions, such as a computer program, software, an application including one or more of logic, rules, algorithms, code, tables, etc. and/or other instructions capable of being executed by a processor. Examples of memory 430 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information, data, and/or instructions that may be used by processor 420.

Other embodiments of wireless device 310 may optionally include additional components beyond those shown in FIG. 4 that may be responsible for providing certain aspects of the wireless device's functionality, including any of the functionality described above and/or any additional functionality (including any functionality necessary to support the solution described above). As just one example, wireless device 310 may include input devices and circuits, output devices, and one or more synchronization units or circuits, which may be part of the processing circuitry 420. Input devices include mechanisms for entry of data into wireless device 310. For example, input devices may include input mechanisms, such as a microphone, input elements, a display, etc. Output devices may include mechanisms for outputting data in audio, video, and/or hard copy format. For example, output devices may include a speaker, a display, etc.

Figure 5:
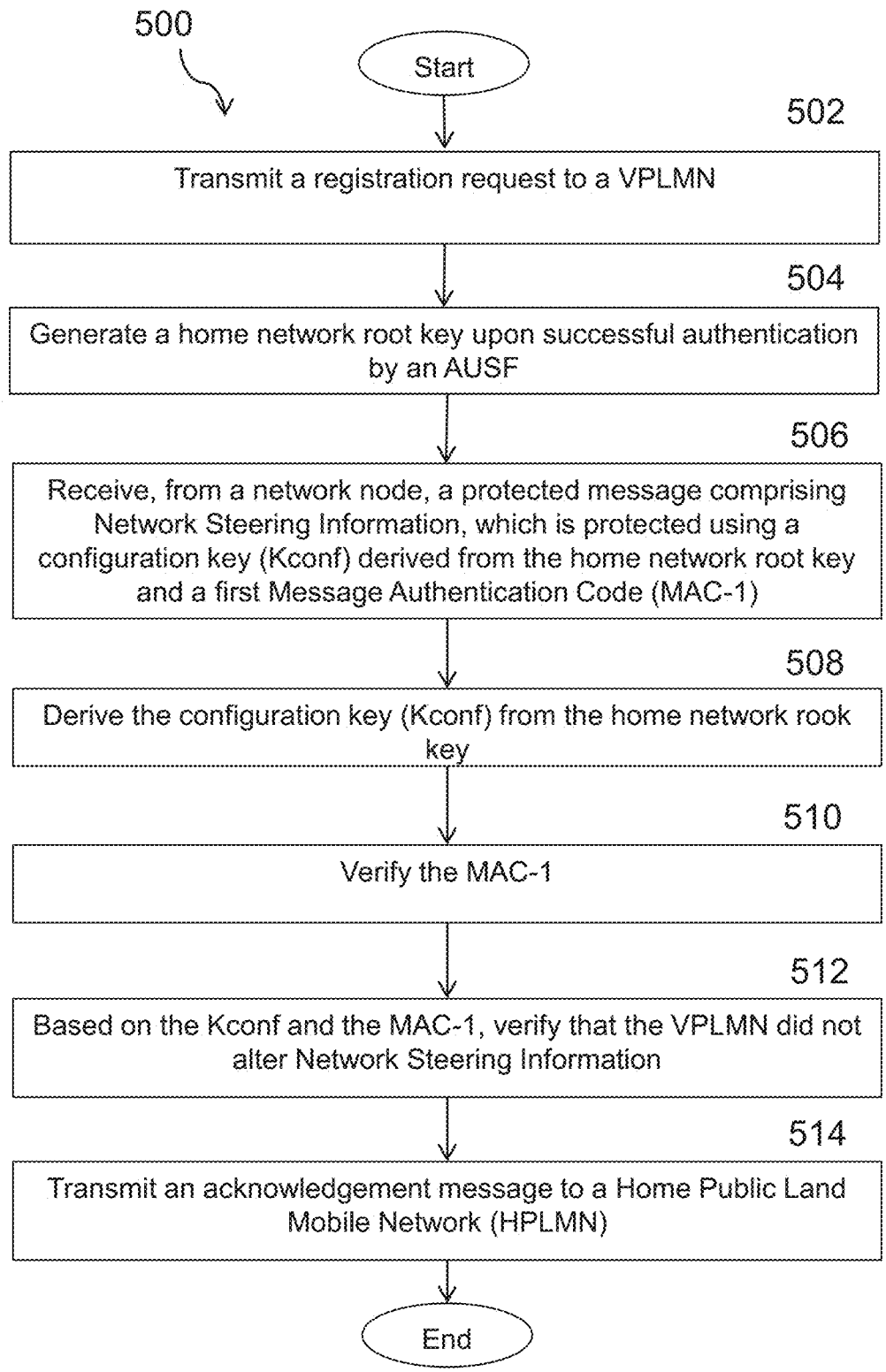
FIG. 5 illustrates an example method by a UE for securing network steering information, in accordance with certain embodiments.

FIG. 5 illustrates an example method 500 by a UE for securing network steering information, according to certain embodiments. The UE may include a wireless device such as wireless device 310, in a particular embodiment.

At step 502, the UE transmits a registration request to a VPLMN. The UE may generate a home network root key upon successful authentication by an AUSF at step 504. In a particular embodiment, for example, the UE generates a Kausf.

At step 506, the UE receives, from a network node, a protected message comprising Network Steering Information, which is protected using a configuration key (Kconf) derived from the home network root key and a first Message Authentication Code (MAC-1).

At step 508, the UE derives the configuration key (Kconf) from the home network rook key. The UE verifies the MAC-1 at step 510. Based on the Kconf and the MAC-1, the UE verifies that the VPLMN did not alter Network Steering Information at 512. Thereafter, UE transmits an acknowledgement message to a Home Public Land Mobile Network (HPLMN) at step 514. The acknowledgement message is protected with a second Message Authentication Code (MAC-2).

Certain embodiments may comprise more or fewer actions, and the actions may be performed in any suitable order.

Figure 6:
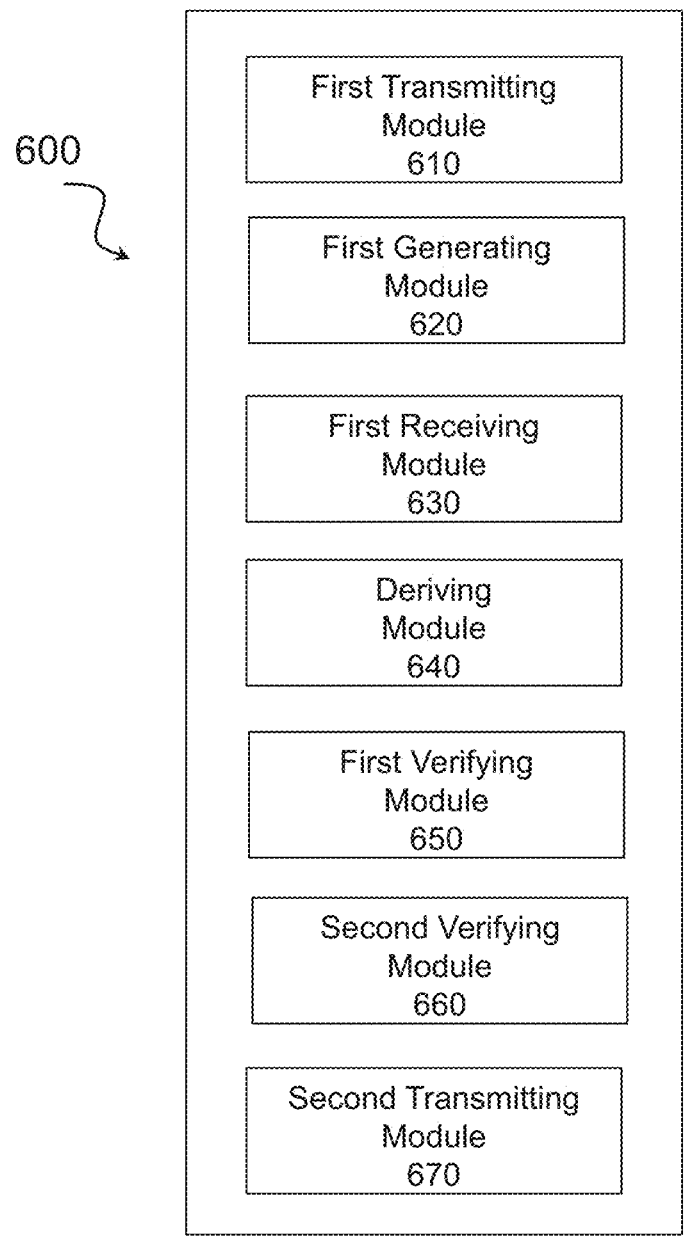
FIG. 6 illustrates an example virtual computing device for securing network steering information, in accordance with certain embodiments.

In certain embodiments, the method for securing network steering information may be performed by a virtual computing device. FIG. 6 illustrates an example virtual computing device 600 for securing network steering information, according to certain embodiments. In certain embodiments, virtual computing device 600 may include modules for performing steps similar to those described above with regard to the method illustrated and described in FIG. 5. For example, virtual computing device 900 may include a first transmitting module 610, a first generating module 620, a first receiving module 630, a deriving module 640, a first verifying module 650, a second verifying module 660, a second transmitting module 670, and any other suitable modules for securing network steering information. In some embodiments, one or more of the modules may be implemented using processing circuitry 420 of FIG. 4. In certain embodiments, the functions of two or more of the various modules may be combined into a single module.

The first transmitting module 610 may perform certain of the transmitting functions of virtual computing device 600. For example, in a particular embodiment, first transmitting module 610 may transmits a registration request to a VPLMN.

The first generating module 620 may perform certain of the generating functions of virtual computing device 600. For example, in a particular embodiment, first generating module 620 may generate a home network root key upon successful authentication by an AUSF.

The first receiving module 630 may perform certain of the receiving functions of virtual computing device 600. For example, in a particular embodiment, first receiving module 630 may receive, from a network node, a protected message comprising Network Steering Information, which is protected using a configuration key (Kconf) derived from the home network root key and a first Message Authentication Code (MAC-1).

The deriving module 640 may perform certain of the deriving functions of virtual computing device 600. For example, in a particular embodiment, deriving module 640 may derive the configuration key (Kconf) from the home network rook key.

The first verifying module 650 may perform certain of the verifying functions of virtual computing device 600. For example, in a particular embodiment, first verifying module 650 may verify the MAC-1.

The second verifying module 660 may perform certain of the verifying functions of virtual computing device 600. For example, in a particular embodiment, second verifying module 660 may verify that the VPLMN did not alter Network Steering Information based on the Kconf and the MAC-1.

The second transmitting module 670 may perform certain of the transmitting functions of virtual computing device 600. For example, in a particular embodiment, second transmitting module 670 may transmit an acknowledgement message to HPLMN.

Other embodiments of virtual computing device 600 may include additional components beyond those shown in FIG. 6 that may be responsible for providing certain aspects of the UE's functionality, including any of the functionality described above and/or any additional functionality (including any functionality necessary to support the solutions described above). The various different types of UEs which may comprise the transmitter may include components having the same physical hardware but configured (e.g., via programming) to support different radio access technologies, or may represent partly or entirely different physical components.

Figure 7:
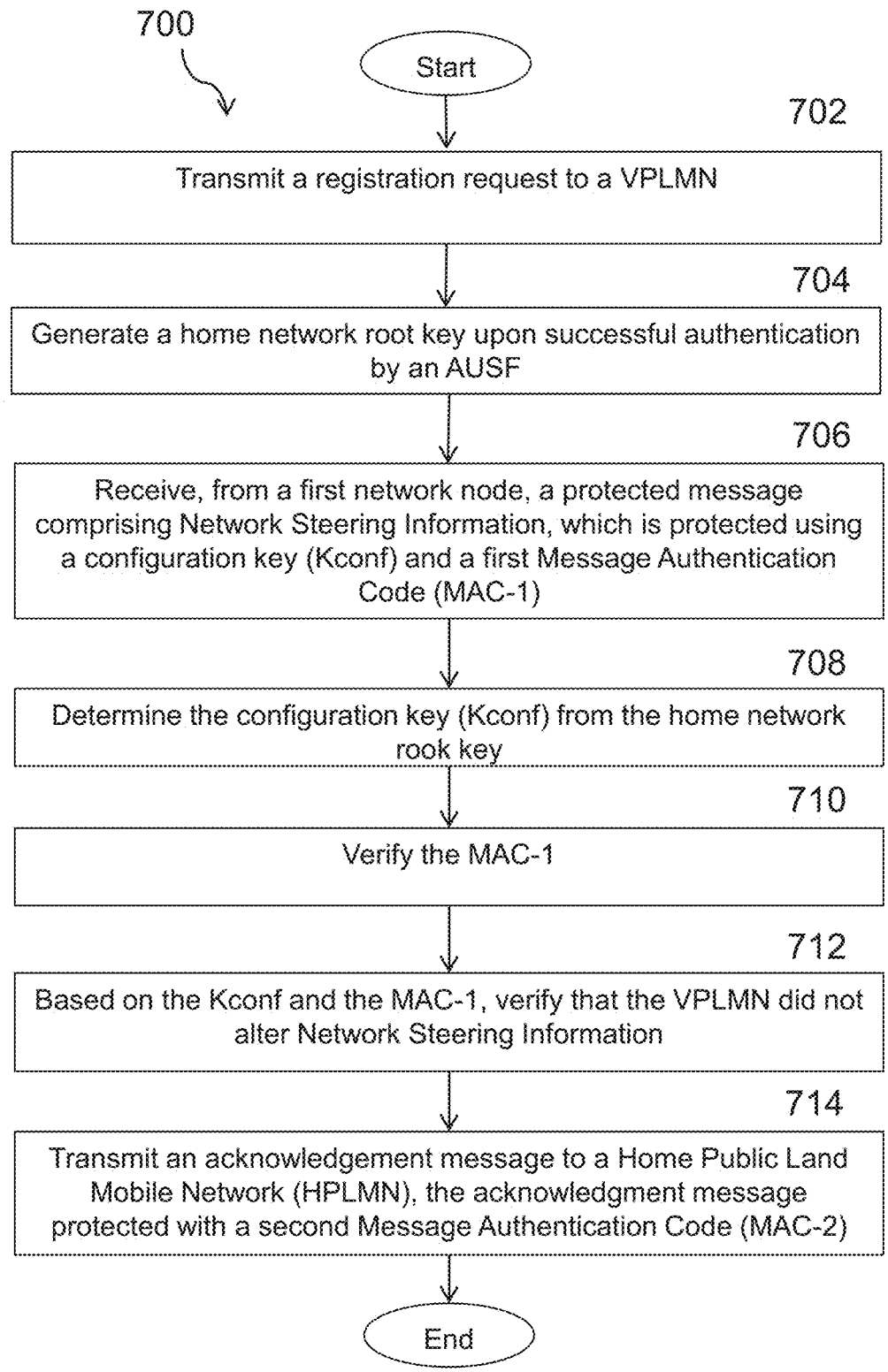
FIG. 7 illustrates an example method by a UE for securing network steering information, in accordance with certain embodiments.

FIG. 7 illustrates an example method 700 by a UE for securing network steering information, according to certain embodiments. The UE may include a wireless device such as wireless device 310, in a particular embodiment.

At step 702, the UE transmits a registration request to a VPLMN.

At step 704, the UE generates a home network root key upon successful authentication by an AUSF.

At step 706, the UE receives, from a first network node, a protected message comprising Network Steering Information, which is protected using a Kconf and a MAC-1.

In a particular embodiment, the first network node comprises the AUSF. In a particular embodiment, the Network Steering Information may be generated by a second network node such as, for example, a UDM, and protected by the AUSF.

In yet another particular embodiment, a third network node located in the VPLMN may include AMF/SEAF which forwards the protected message comprising the Network Steering Information from the second network node.

In a particular embodiment, the protected message may be confidentiality protected over the air with NAS security. Additionally or alternatively, the protected message may be piggybacked with a Registration Accept message, in a particular embodiment.

At step 708, the UE determines the configuration key (Kconf) from the home network rook key. In a particular embodiment, the configuration key is the home network root key. Additionally or alternatively, the home network root key is a Kausf, in a particular embodiment.

At step 710, the UE verifies the MAC-1.

At step 712, based on the Kconf and the MAC-1, the UE verifies that the VPLMN did not alter Network Steering Information.

At step 714, the UE transmits an acknowledgement message to a HPLMN. The acknowledgement message is protected with a MAC-2.

Certain embodiments may comprise more or fewer actions, and the actions may be performed in any suitable order.

Figure 8:
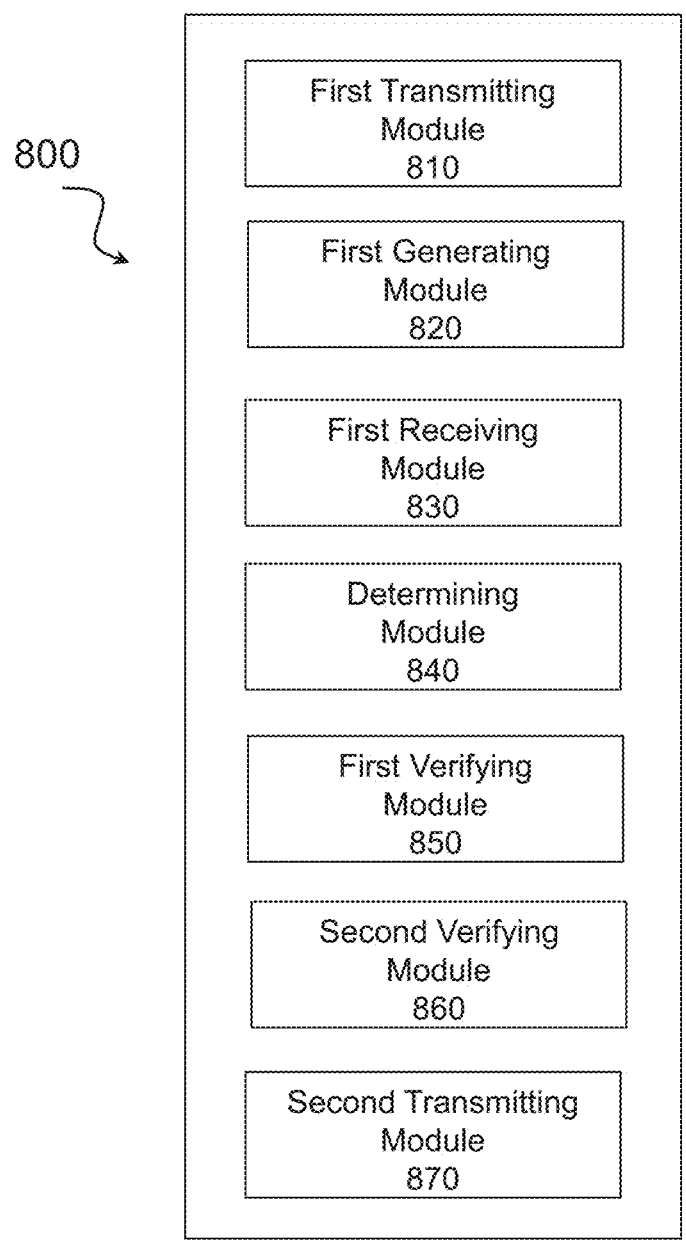
FIG. 8 illustrates an example virtual computing device for securing network steering information, in accordance with certain embodiments.

In certain embodiments, the method for securing network steering information may be performed by a virtual computing device. FIG. 8 illustrates an example virtual computing device 800 for securing network steering information, according to certain embodiments. In certain embodiments, virtual computing device 800 may include modules for performing steps similar to those described above with regard to the method illustrated and described in FIG. 7. For example, virtual computing device 800 may include a first transmitting module 810, a first generating module 820, a first receiving module 830, a determining module 840, a first verifying module 850, a second verifying module 860, a second transmitting module 870, and any other suitable modules for securing network steering information. In some embodiments, one or more of the modules may be implemented using processing circuitry 420 of FIG. 4. In certain embodiments, the functions of two or more of the various modules may be combined into a single module.

The first transmitting module 810 may perform certain of the transmitting functions of virtual computing device 800. For example, in a particular embodiment, first transmitting module 810 may transmits a registration request to a VPLMN.

The first generating module 820 may perform certain of the generating functions of virtual computing device 800. For example, in a particular embodiment, first generating module 820 may generate a home network root key upon successful authentication by an AUSF.

The first receiving module 830 may perform certain of the receiving functions of virtual computing device 800. For example, in a particular embodiment, first receiving module 830 may receive, from a network node, a protected message comprising Network Steering Information, which is protected using a configuration key (Kconf) and a MAC-1.

The determining module 840 may perform certain of the determining functions of virtual computing device 800. For example, in a particular embodiment, determining module 840 may determine the Kconf from the home network rook key.

The first verifying module 850 may perform certain of the verifying functions of virtual computing device 800. For example, in a particular embodiment, first verifying module 850 may verify the MAC-1.

The second verifying module 860 may perform certain other of the verifying functions of virtual computing device 800. For example, in a particular embodiment, second verifying module 860 may verify that the VPLMN did not alter Network Steering Information based on the Kconf and the MAC-1.

The second transmitting module 870 may perform certain of the transmitting functions of virtual computing device 800. For example, in a particular embodiment, second transmitting module 870 may transmit an acknowledgement message that is protected with a MAC-2 to the HPLMN.

Other embodiments of virtual computing device 800 may include additional components beyond those shown in FIG. 8 that may be responsible for providing certain aspects of the UE's functionality, including any of the functionality described above and/or any additional functionality (including any functionality necessary to support the solutions described above). The various different types of UEs which may comprise the transmitter may include components having the same physical hardware but configured (e.g., via programming) to support different radio access technologies, or may represent partly or entirely different physical components.

Figure 9:
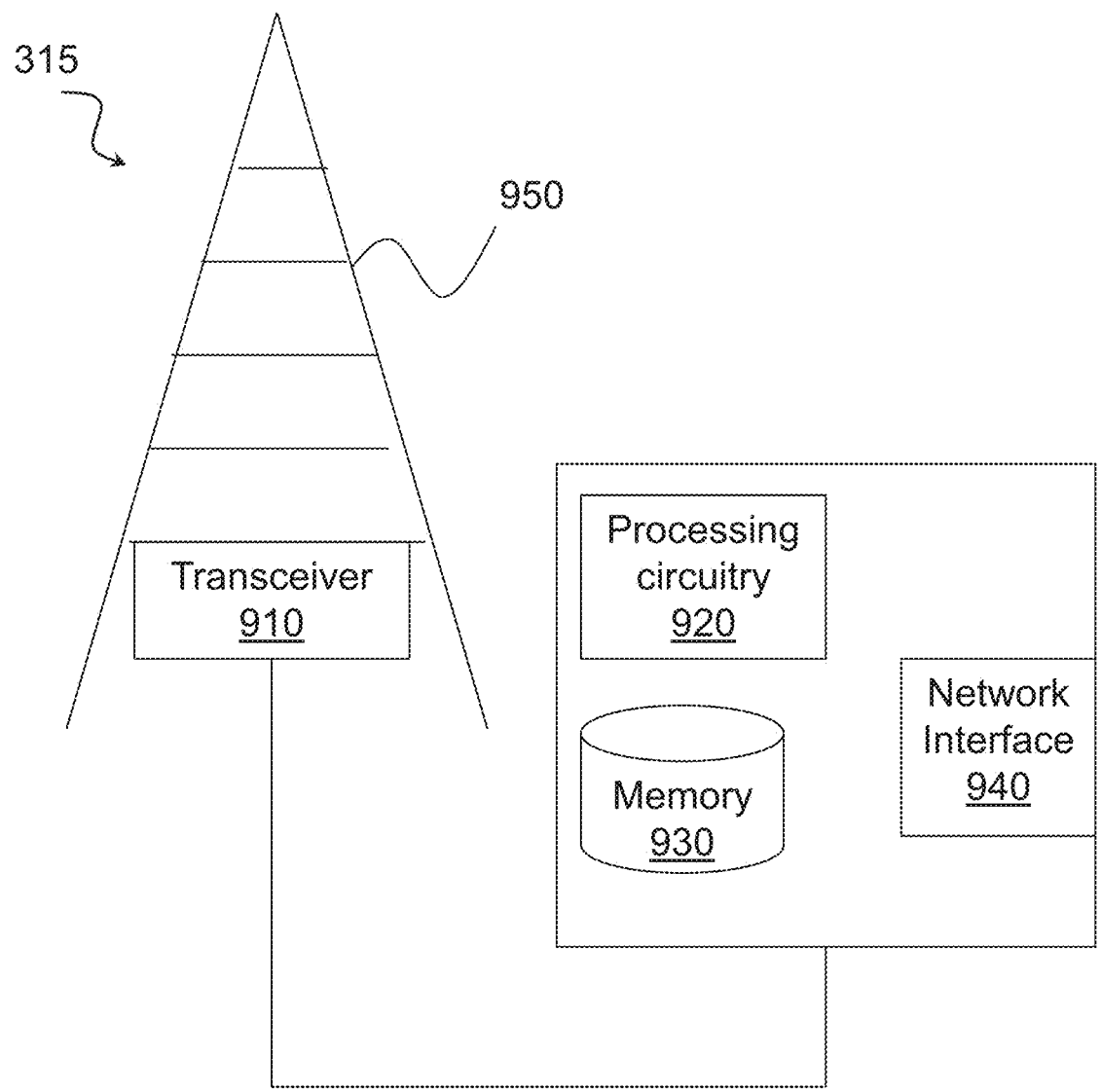
FIG. 9 illustrates an example network node for securing network steering information, in accordance with certain embodiments.

FIG. 9 illustrates an example network node 315 for securing network steering information, in accordance with certain embodiments. Network node 315 may be any type of radio network node or any network node that communicates with a UE and/or with another network node. Examples of network node 315 include an gNB, eNodeB, a node B, a base station, a wireless access point (e.g., a Wi-Fi access point), a low power node, a base transceiver station (BTS), relay, donor node controlling relay, transmission points, transmission nodes, remote RF unit (RRU), remote radio head (RRH), multi-standard radio (MSR) radio node such as MSR BS, nodes in distributed antenna system (DAS), O&M, OSS, SON, positioning node (e.g., E-SMLC), MDT, or any other suitable network node. Network nodes 315 may be deployed throughout network 300 as a homogenous deployment, heterogeneous deployment, or mixed deployment. A homogenous deployment may generally describe a deployment made up of the same (or similar) type of network nodes 315 and/or similar coverage and cell sizes and inter-site distances. A heterogeneous deployment may generally describe deployments using a variety of types of network nodes 315 having different cell sizes, transmit powers, capacities, and inter-site distances. For example, a heterogencous deployment may include a plurality of low-power nodes placed throughout a macro-cell layout. Mixed deployments may include a mix of homogenous portions and heterogeneous portions.

Network node 315 may include one or more of transceiver 910, processing circuitry 920 (e.g., which may include one or more processors), memory 930, and network interface 940. In some embodiments, transceiver 910 facilitates transmitting wireless signals to and receiving wireless signals from wireless device 310 (e.g., via antenna 950), processing circuitry 920 executes instructions to provide some or all of the functionality described above as being provided by a network node 315, memory 930 stores the instructions executed by processing circuitry 920, and network interface 940 communicates signals to backend network components, such as a gateway, switch, router, Internet, Public Switched Telephone Network (PSTN), core network nodes or radio network controllers, etc.

Processing circuitry 920 may include any suitable combination of hardware and software implemented in one or more modules to execute instructions and manipulate data to perform some or all of the described functions of network node 315, such as those described in relation to any of sections 3, 4, or 6 herein. For example, in general, processing circuitry 920 may cause network node to send a paging message that includes a system information notification. In certain embodiments, the system information notification may be sent in response to detecting a change in the risk of an overload situation on access resources and may indicate that the wireless device 310 is to apply a previously stored version of system information. In some embodiments, processing circuitry 920 may include, for example, one or more computers, one or more central processing units (CPUs), one or more microprocessors, one or more applications, and/or other logic.

Memory 930 is generally operable to store instructions, such as a computer program, software, an application including one or more of logic, rules, algorithms, code, tables, etc. and/or other instructions capable of being executed by a processor. Examples of memory 930 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 940 is communicatively coupled to processing circuitry 920 and may refer to any suitable device operable to receive input for network node 315, send output from network node 315, perform suitable processing of the input or output or both, communicate to other devices, or any combination of the preceding. Network interface 940 may include appropriate hardware (e.g., port, modem, network interface card, etc.) and software, including protocol conversion and data processing capabilities, to communicate through a network.

Other embodiments of network node 315 may include additional components beyond those shown in FIG. 9 that may be responsible for providing certain aspects of the radio network node's functionality, including any of the functionality described above and/or any additional functionality (including any functionality necessary to support the solutions described above). The various different types of network nodes may include components having the same physical hardware but configured (e.g., via programming) to support different radio access technologies, or may represent partly or entirely different physical components.

Figure 10:
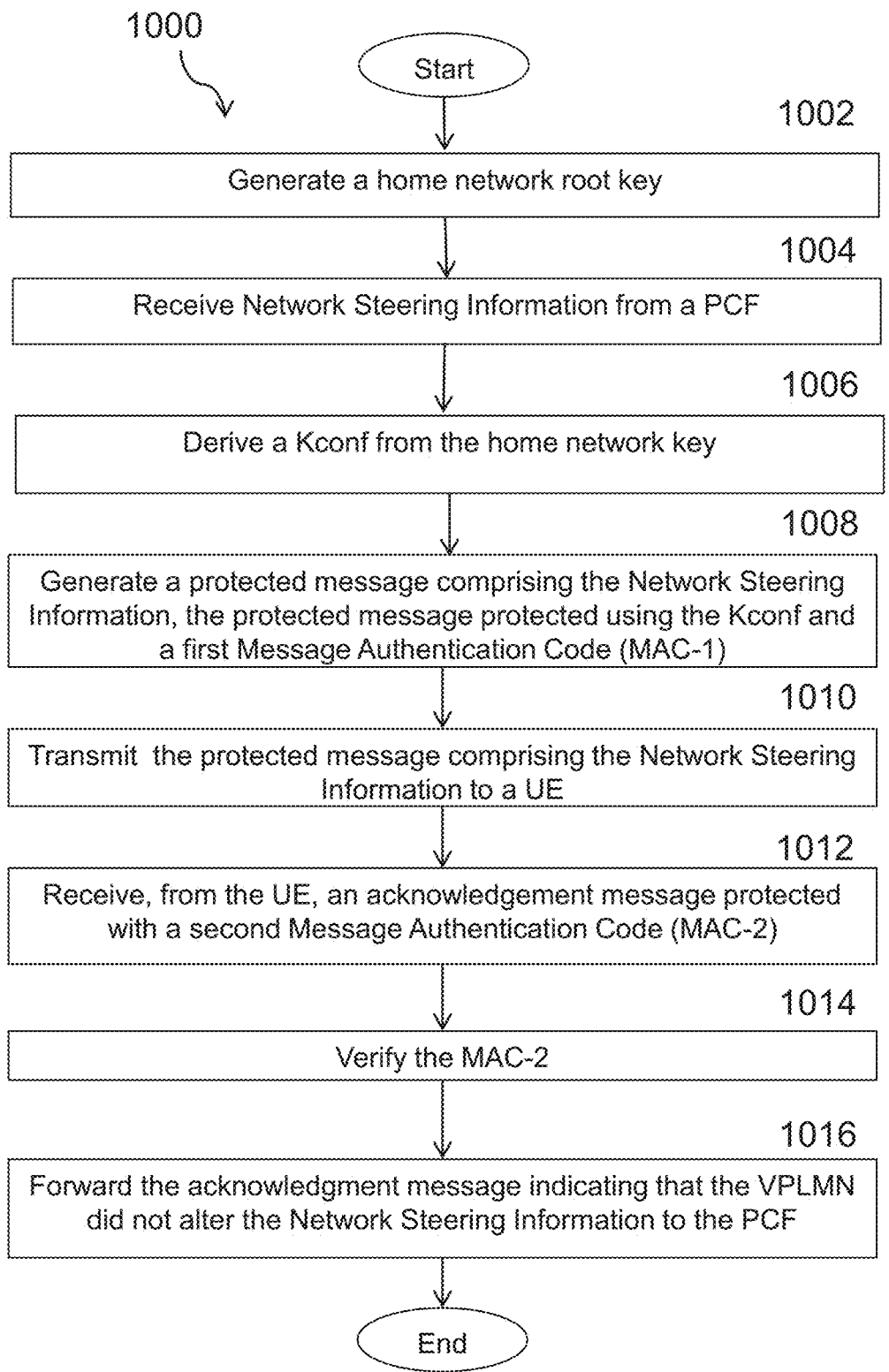
FIG. 10 illustrates an example method by a network node operating as an authentication server function (AUSF) for securing network steering information, in accordance with certain embodiments.

FIG. 10 illustrates an example method 1000 by a network node operating as an authentication server function (AUSF) for securing network steering information, according to certain embodiments. The method begins at step 1002 when network node 315 generates a home network root key.

At step 1004, the network node receives Network Steering Information from a PCF.

At step 1006, the network node derives a Kconf from the home network key.

At step 1008, the network node generates a protected message comprising the Network Steering Information. The protected message may be protected using the Kconf and a (MAC-1.

At step 1010, the network node transmits the protected message comprising the Network Steering Information to a UE.

At step 1012, the network node receives, from the UE, an acknowledgement message protected with a MAC-2. The acknowledgment indicates that the VPLMN did not alter the Network Steering Information.

At step 1014, the network node verifies the MAC-2.

At step 1016, the network node forwards the acknowledgment message indicating that the VPLMN did not alter the Network Steering Information to the PCF.

Certain embodiments may comprise more or fewer actions, and the actions may be performed in any suitable order.

Figure 11:
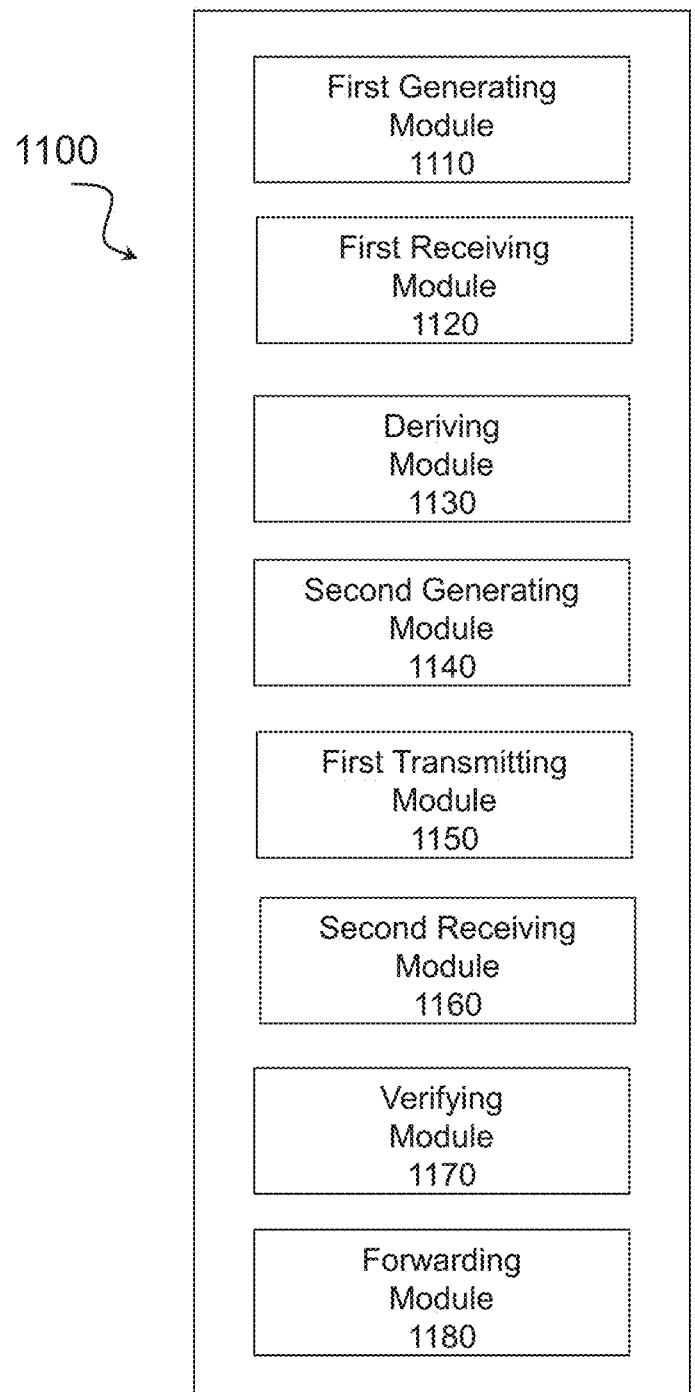
FIG. 11 illustrates an example virtual computing device for securing network steering information, in accordance with certain embodiments.

In certain embodiments, the method for securing network steering information, as described above may be performed by a virtual computing device. FIG. 11 illustrates an example virtual computing device 900 for securing network steering information, according to certain embodiments. In certain embodiments, virtual computing device 1100 may include modules for performing steps similar to those described above with regard to the method illustrated and described in FIG. 10. For example, virtual computing device 1100 may include a first generating module 1110, a first receiving module 1120, a deriving module 1130, a second generating module 1140, a first transmitting module 1150, a second receiving module 1160, a verifying module 1170, a forwarding module 1180, and any other suitable modules for securing network steering information. In some embodiments, one or more of the modules may be implemented using processing circuitry 920 of FIG. 9. In certain embodiments, the functions of two or more of the various modules may be combined into a single module.

The first generating module 1110 may perform certain of the generating functions of virtual computing device 1100. For example, in a particular embodiment, first generating module 1110 may generate a home network root key.

The first receiving module 1120 may perform certain of the receiving functions of virtual computing device 1100. For example, in a particular embodiment, first receiving module 1120 may receive Network Steering Information from a PCF.

The deriving module 1130 may perform certain of the deriving functions of virtual computing device 1100. For example, in a particular embodiment, deriving module 1130 may derive a Kconf from the home network key.

The second generating module 1140 may perform certain of the generating functions of virtual computing device 1100. For example, in a particular embodiment, generating module 1140 may generate a protected message comprising the Network Steering Information. The protected message may be protected using the Kconf and a first Message Authentication Code (MAC-1).

The first transmitting module 1150 may perform certain of the transmitting functions of virtual computing device 100. For example, in a particular embodiment, first transmitting module 1150 may transmit the protected message comprising the Network Steering Information to a UE.

The second receiving module 960 may perform certain of the receiving functions of virtual computing device 1100. For example, in a particular embodiment, second receiving module 1160 may receive, from the UE, an acknowledgement message protected with a second Message Authentication Code (MAC-2). The acknowledgment indicates that the VPLMN did not alter the Network Steering Information.

The verifying module 1170 may perform certain of the verifying functions of virtual computing device 1100. For example, in a particular embodiment, verifying module 1170 may verify the MAC-2.

The forwarding module 1180 may perform certain of the forwarding functions of virtual computing device 1100. For example, in a particular embodiment, forwarding module 1180 may forward the acknowledgment message indicating that the VPLMN did not alter the Network Steering Information to the PCF.

Other embodiments of virtual computing device 1100 may include additional components beyond those shown in FIG. 11 that may be responsible for providing certain aspects of the network node's functionality, including any of the functionality described above and/or any additional functionality (including any functionality necessary to support the solutions described above). The various different types of network nodes which may comprise the transmitter may include components having the same physical hardware but configured (e.g., via programming) to support different radio access technologies, or may represent partly or entirely different physical components.

Figure 12:
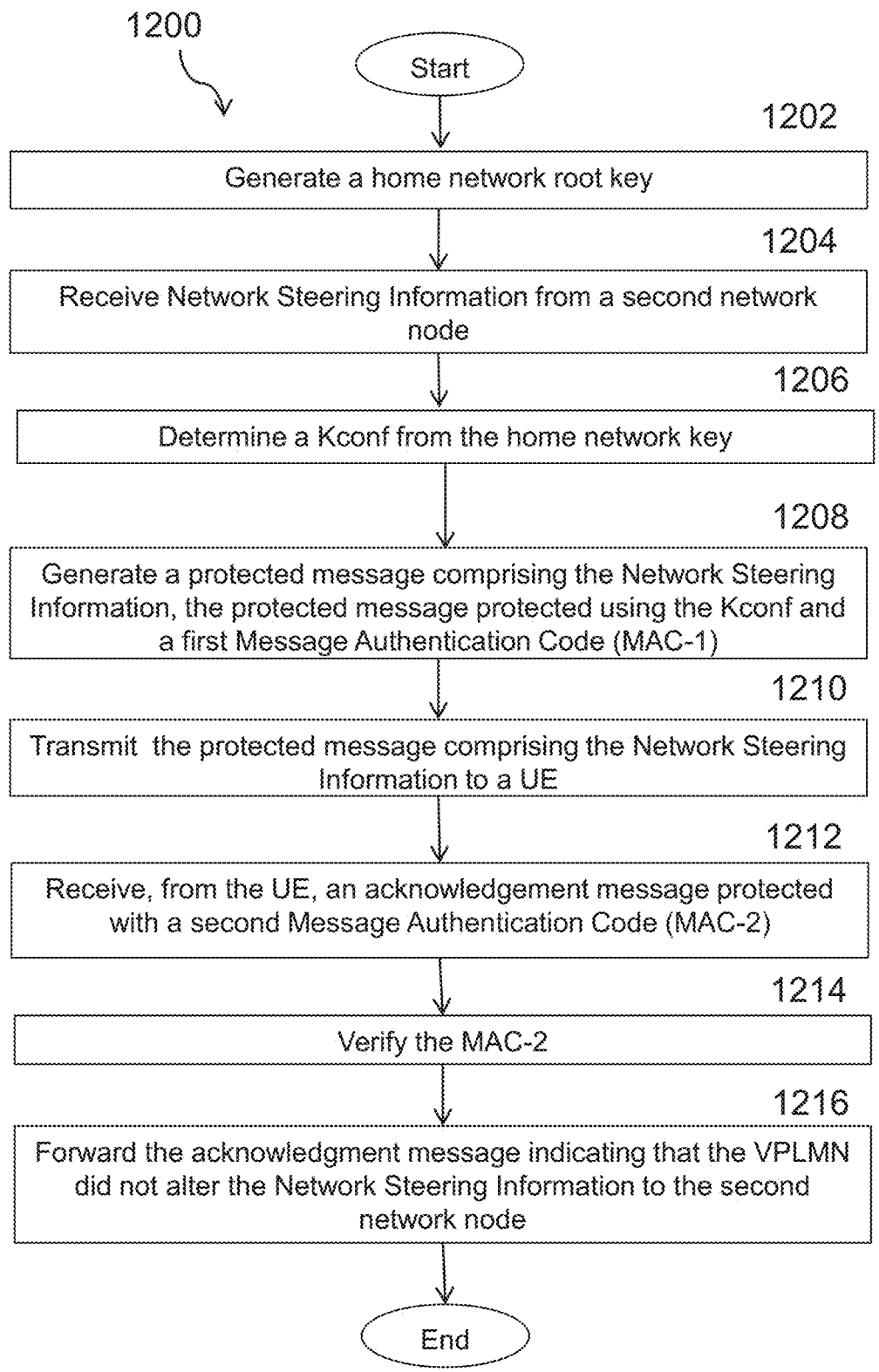
FIG. 12 illustrates an example method by a first network node operating as an authentication server function (AUSF) for securing network steering information, in accordance with certain embodiments.

FIG. 12 illustrates an example method 1200 by a first network node operating as an authentication server function (AUSF) for securing network steering information, according to certain embodiments. In a particular embodiment, the first network node may include a network node such as network node 315.

At step 1202, the method begins when first network node 315 generates a home network root key.

At step 1204, the first network node 315 receives Network Steering Information from a second network node. In a particular embodiment, the second network node may be operating as at least one of a PCF or a UDM.

At step 1206, the first network node 315 determines a Kconf from the home network key. In a particular embodiment, the configuration key is the home network root key. For example, the home network root key may be a Kausf, in a particular embodiment.

At step 1208, the first network node 315 generates a protected message comprising the Network Steering Information. The protected message may be protected using the Kconf and a MAC-1. In a particular embodiment, the protected message may be piggybacked with a Registration Accept message.

At step 1210, the first network node 315 transmits the protected message comprising the Network Steering Information to a UE 310.

At step 1212, the first network node 315 receives, from the UE 310, an acknowledgement message protected with a MAC-2. The acknowledgment indicates that the VPLMN did not alter the Network Steering Information.

At step 1214, the first network node verifies the MAC-2.

At step 1216, the first network node forwards the acknowledgment message indicating that the VPLMN did not alter the Network Steering Information to the second network node.

Certain embodiments may comprise more or fewer actions, and the actions may be performed in any suitable order.

Figure 13:
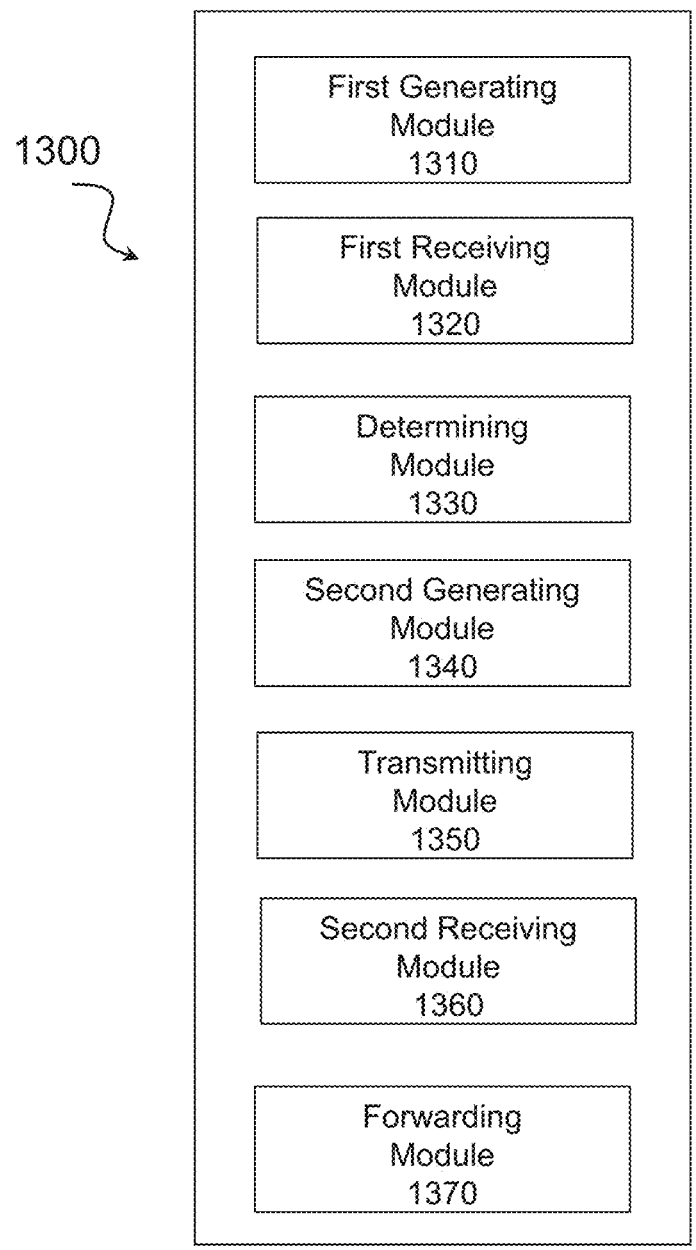
FIG. 13 illustrates an example virtual computing device for securing network steering information, in accordance with certain embodiments.

In certain embodiments, the method for securing network steering information, as described above may be performed by a virtual computing device. FIG. 13 illustrates an example virtual computing device 1300 for securing network steering information, according to certain embodiments. In certain embodiments, virtual computing device 1300 may include modules for performing steps similar to those described above with regard to the method illustrated and described in FIG. 12. For example, virtual computing device 1300 may include a first generating module 1310, a first receiving module 1320, a determining module 1330, a second generating module 1340, a transmitting module 1350, a second receiving module 1360, a forwarding module 1370, and any other suitable modules for securing network steering information. In some embodiments, one or more of the modules may be implemented using processing circuitry 920 of FIG. 9. In certain embodiments, the functions of two or more of the various modules may be combined into a single module.

The first generating module 1310 may perform certain of the generating functions of virtual computing device 1300. For example, in a particular embodiment, first generating module 1310 may generate a home network root key.

The first receiving module 1320 may perform certain of the receiving functions of virtual computing device 1300. For example, in a particular embodiment, first receiving module 1320 may receive Network Steering Information from a second network node.

The determining module 1330 may perform certain of the determining functions of virtual computing device 1300. For example, in a particular embodiment, determining module 1330 may determine a Kconf from the home network key.

The second generating module 1340 may perform certain other of the generating functions of virtual computing device 1300. For example, in a particular embodiment, second generating module 1340 may generate a protected message comprising the Network Steering Information. The protected message may be protected using the Kconf and a MAC-1.

The transmitting module 1350 may perform certain of the transmitting functions of virtual computing device 1300. For example, in a particular embodiment, transmitting module 1350 may transmit the protected message comprising the Network Steering Information to a UE.

The second receiving module 1360 may perform certain other of the receiving functions of virtual computing device 1300. For example, in a particular embodiment, second receiving module 1360 may receive, from the UE, an acknowledgement message protected with a MAC-2. The acknowledgment indicates that the VPLMN did not alter the Network Steering Information.

The forwarding module 1370 may perform certain of the forwarding functions of virtual computing device 1300. For example, in a particular embodiment, forwarding module 1380 may forward the acknowledgment message indicating that the VPLMN did not alter the Network Steering Information to the second network node.

Other embodiments of virtual computing device 1300 may include additional components beyond those shown in FIG. 13 that may be responsible for providing certain aspects of the network node's functionality, including any of the functionality described above and/or any additional functionality (including any functionality necessary to support the solutions described above). The various different types of network nodes which may comprise the transmitter may include components having the same physical hardware but configured (e.g., via programming) to support different radio access technologies, or may represent partly or entirely different physical components.

Figure 14:
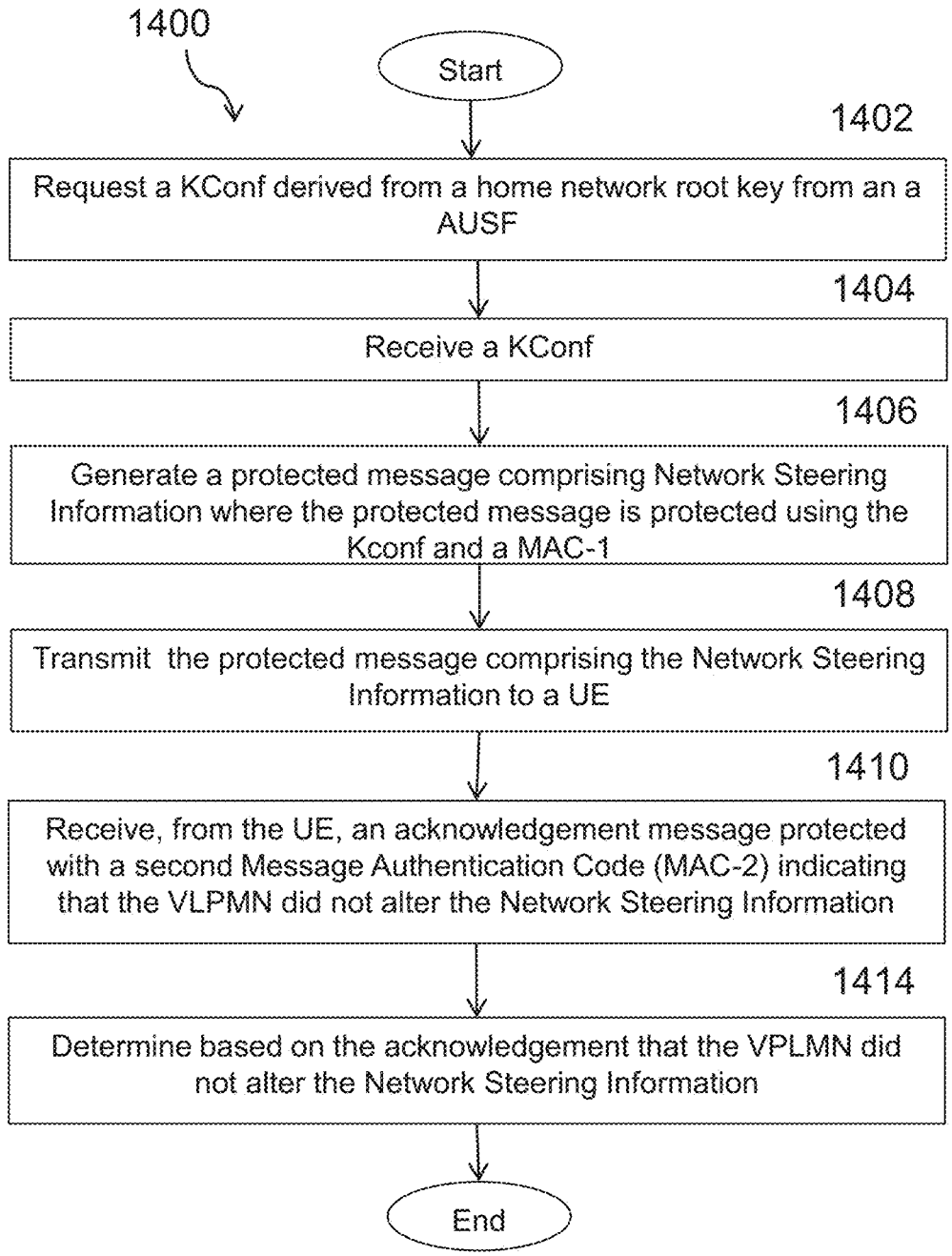
FIG. 14 illustrates an example method by a network node operating as a PCF for securing network steering information, in accordance with certain embodiments.

FIG. 14 illustrates an example method 1400 by a network node operating as a PCF for securing network steering information, according to certain embodiments. The method begins at step 1402 when the network node requests a KConf derived from a home network root key from an AUSF.

At step 1404, the network node receives a KConf.

At step 1406, the network node generates a protected message comprising Network Steering Information where the protected message is protected using the Kconf and a MAC-1.

At step 1408, the network node transmits the protected message comprising the Network Steering Information to a UE.

At step 1410, the network node receives, from the UE, an acknowledgement message protected with a MAC-2. The acknowledgment indicates that the VPLMN did not alter the Network Steering Information.

At step 1412, the network node verifies the MAC-2.

At step 1414, the network node determines based on the acknowledgement that the VPLMN did not alter the Network Steering Information.

Certain embodiments may comprise more or fewer actions, and the actions may be performed in any suitable order.

Figure 15:
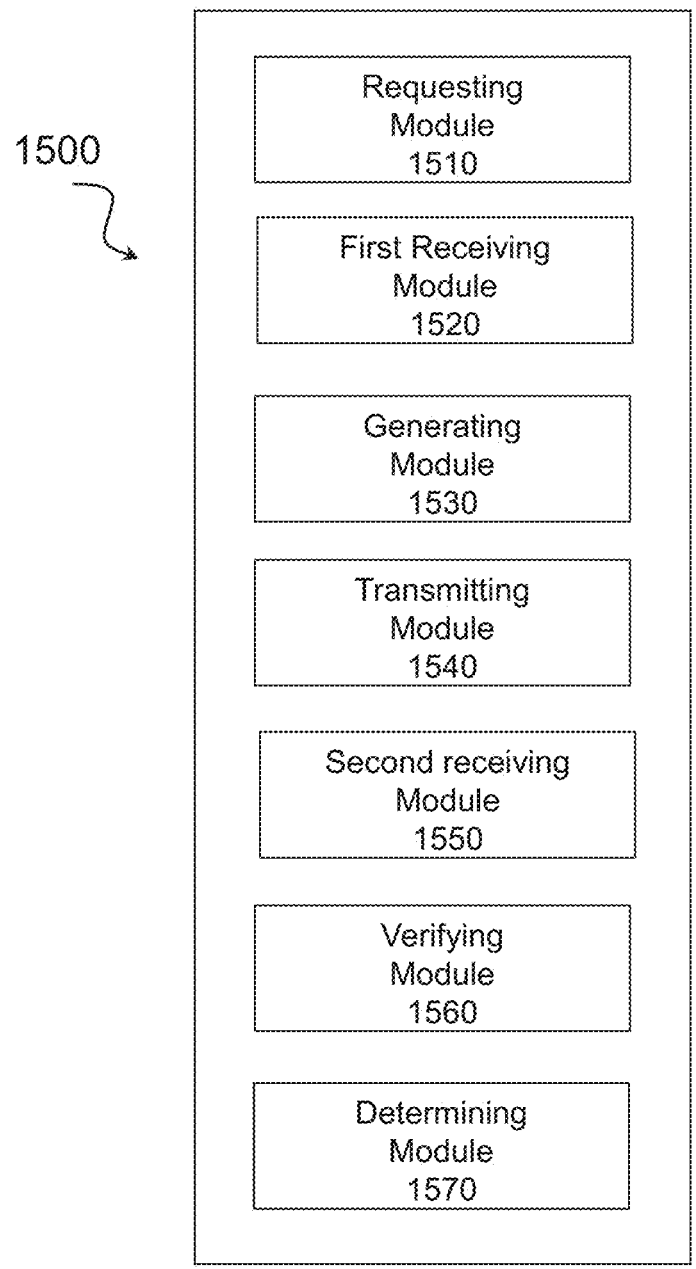
FIG. 15 illustrates an example virtual computing device for securing network steering information, in accordance with certain embodiments.

In certain embodiments, the method for securing network steering information, as described above may be performed by a virtual computing device. FIG. 15 illustrates an example virtual computing device 1500 for securing network steering information, according to certain embodiments. In certain embodiments, virtual computing device 1500 may include modules for performing steps similar to those described above with regard to the method illustrated and described in FIG. 14. For example, virtual computing device 1500 may include a requesting module 1510, a first receiving module 1520, a generating module 1530, a transmitting module 1540, a second receiving module 1550, a verifying module 1560, a determining module 1570, and any other suitable modules for securing network steering information. In some embodiments, one or more of the modules may be implemented using processing circuitry 920 of FIG. 9. In certain embodiments, the functions of two or more of the various modules may be combined into a single module.

The requesting module 1510 may perform certain of the requesting functions of virtual computing device 1500. For example, in a particular embodiment, requesting module 1510 may request a KConf derived from a home network root key from an a AUSF.

The first receiving module 1520 may perform certain of the receiving functions of virtual computing device 1500. For example, in a particular embodiment, first receiving module 1520 may receive a KConf. The generating module 1530 may perform certain of the generating functions of virtual computing device 1500. For example, in a particular embodiment, generating module 1530 may generate a protected message comprising Network Steering Information where the protected message is protected using the Kconf and a MAC-1.

The transmitting module 1540 may perform certain of the transmitting functions of virtual computing device 1500. For example, in a particular embodiment, transmitting module 1540 may transmit the protected message comprising the Network Steering Information to a UE. The second receiving module 1550 may perform certain of the receiving functions of virtual computing device 1500. For example, in a particular embodiment, second receiving module 1550 may receive, from the UE, an acknowledgement message protected with a second Message Authentication Code (MAC-2). The acknowledgment indicates that the VPLMN did not alter the Network Steering Information. The verifying module 1560 may perform certain of the verifying functions of virtual computing device 1500. For example, in a particular embodiment, verifying module 1160 may verify the MAC-2. The determining module 1570 may perform certain of the determining functions of virtual computing device 1500. For example, in a particular embodiment, determining module 1570 may determine, based on the acknowledgement, that the VPLMN did not alter the Network Steering Information. Other embodiments of virtual computing device 1500 may include additional components beyond those shown in FIG. 15 that may be responsible for providing certain aspects of the network node's functionality, including any of the functionality described above and/or any additional functionality (including any functionality necessary to support the solutions described above). The various different types of network nodes which may comprise the transmitter may include components having the same physical hardware but configured (e.g., via programming) to support different radio access technologies, or may represent partly or entirely different physical components.

Figure 16:
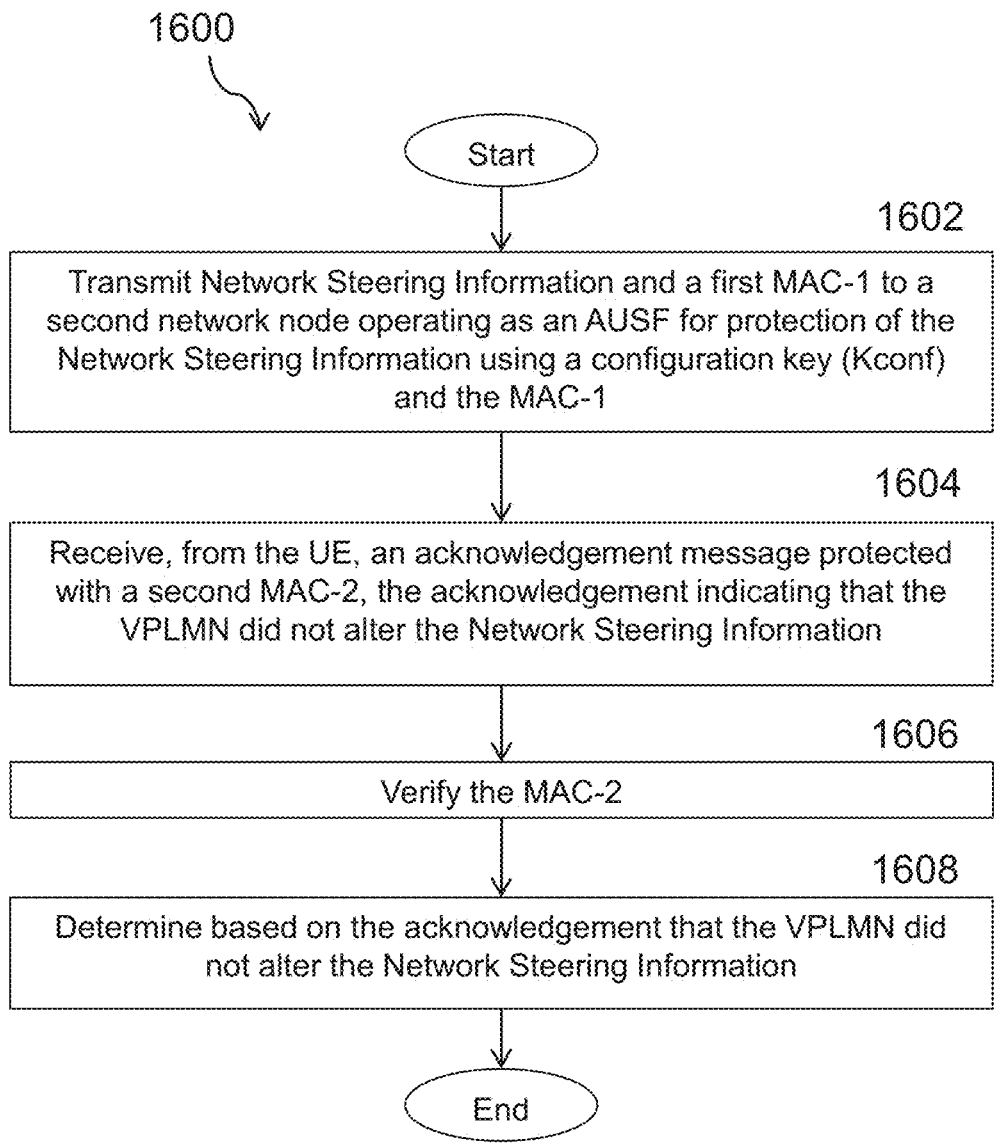
FIG. 16 illustrates an example method for securing network steering information by a first network node, in accordance with certain embodiments.

FIG. 16 illustrates an example method 1600 for securing network steering information by a first network node, according to certain embodiments. In a particular embodiment, the first network node may include a network node such as network node 315, described above. According to certain embodiments, the first network node may operate as a UDM and/or a PCF.

At step 1602, the method begins when the first network node 315 transmits Network Steering Information and a MAC-1 to a second network node operating as an AUSF for protection of the Network Steering Information using a Kconf and the MAC-1. In a particular embodiment, the Kconf is a home network root key such as, for example, a Kausf.

In a particular embodiment, the protected message transmitted to the second network node is piggybacked with a Registration Accept message.

At step 1604, the first network node 315 receives, from the UE 310, an acknowledgement message protected with a MAC-2. The acknowledgment indicates that the VPLMN did not alter the Network Steering Information.

At step 1606, the first network node 315 verifies the MAC-2.

At step 1608, the first network node 315 determines based on the acknowledgement that the VPLMN did not alter the Network Steering Information.

In a particular embodiment, the method further includes the first network node 315 receiving from the second network node operating as the AUSF, the MAC-1 and the MAC-2 and storing the MAC-2. Additionally, the first network node 315 may verify the MAC-2 comprises comparing the stored MAC-2 to the MAC-2 protecting the acknowledgment message from the UE. The first network node 315 may then determine that the stored MAC-2 is the same as the MAC-2 protecting the acknowledgment message.

Certain embodiments may comprise more or fewer actions, and the actions may be performed in any suitable order.

Figure 17:
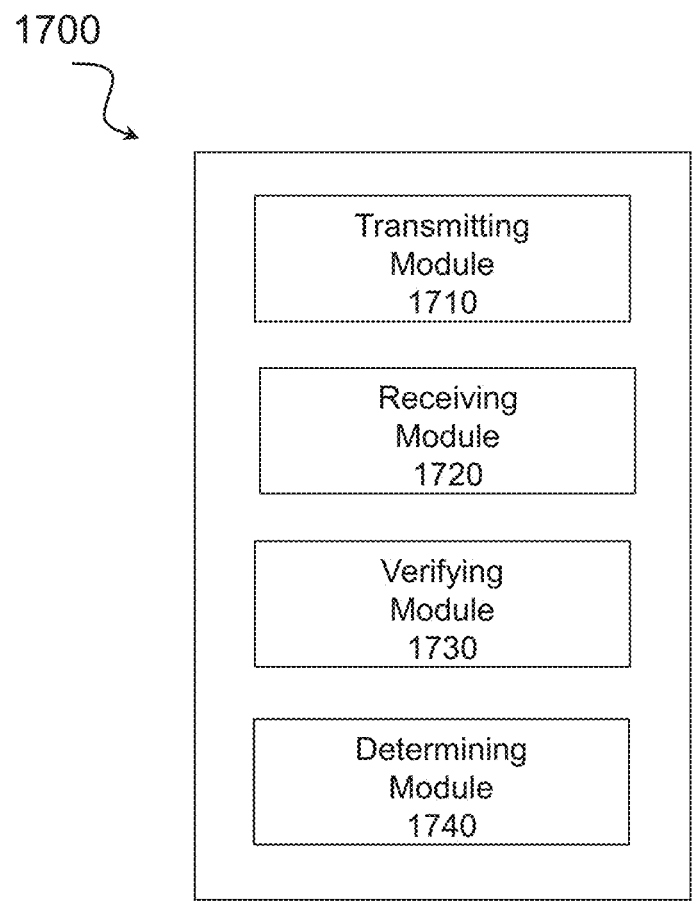
FIG. 17 illustrates an example virtual computing device for securing network steering information, in accordance with certain embodiments.

In certain embodiments, the method for securing network steering information, as described above may be performed by a virtual computing device. FIG. 17 illustrates an example virtual computing device 1700 for securing network steering information, according to certain embodiments. In certain embodiments, virtual computing device 1700 may include modules for performing steps similar to those described above with regard to the method illustrated and described in FIG. 16. For example, virtual computing device 1700 may include a transmitting module 1710, a receiving module 1720, a verifying module 1730, a determining module 1740, and any other suitable modules for securing network steering information. In some embodiments, one or more of the modules may be implemented using processing circuitry 920 of FIG. 9. In certain embodiments, the functions of two or more of the various modules may be combined into a single module.

The transmitting module 1710 may perform certain of the transmitting functions of virtual computing device 1700. For example, in a particular embodiment, transmitting module 1710 may transmit Network Steering Information and a MAC-1 to a second network node operating as an AUSF for protection of the Network Steering Information using a Kconf and the MAC-1

The receiving module 1720 may perform certain of the receiving functions of virtual computing device 1700. For example, in a particular embodiment, receiving module 1720 may receive, from the UE 310, an acknowledgement message protected with a MAC-2. The acknowledgment indicates that the VPLMN did not alter the Network Steering Information.

The verifying module 1730 may perform certain of the verifying functions of virtual computing device 1700. For example, in a particular embodiment, verifying module 1730 may verify the MAC-2.

The determining module 1740 may perform certain of the determining functions of virtual computing device 1700. For example, in a particular embodiment, determining module 1740 may determine based on the acknowledgement that the VPLMN did not alter the Network Steering Information.

Other embodiments of virtual computing device 1700 may include additional components beyond those shown in FIG. 17 that may be responsible for providing certain aspects of the network node's functionality, including any of the functionality described above and/or any additional functionality (including any functionality necessary to support the solutions described above). The various different types of network nodes which may comprise the transmitter may include components having the same physical hardware but configured (e.g., via programming) to support different radio access technologies, or may represent partly or entirely different physical components.

Figure 18:
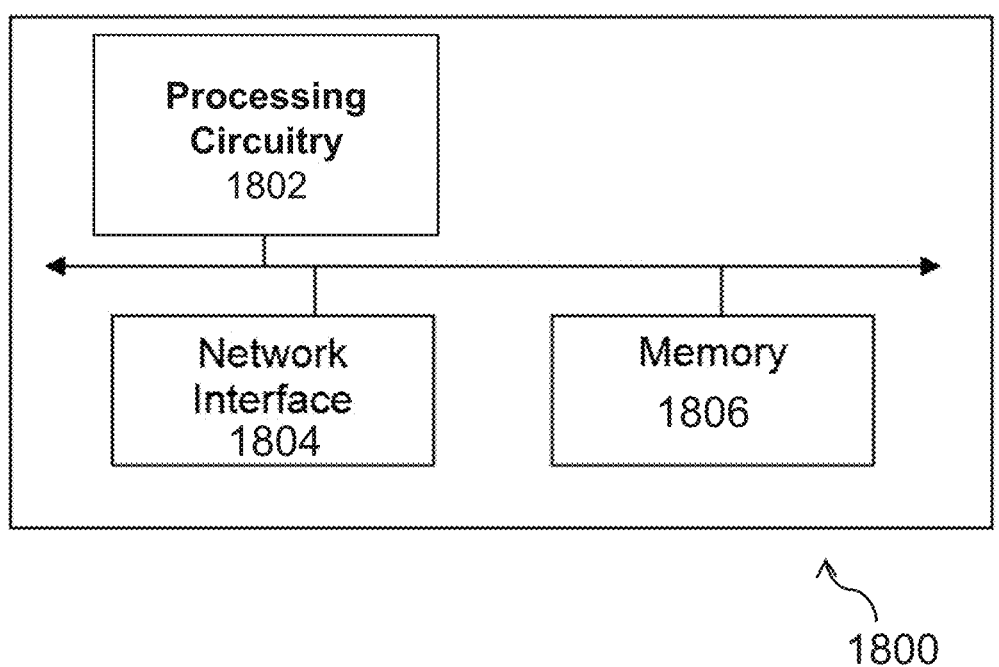
FIG. 18 illustrates an example radio network controller or core network node, in accordance with certain embodiments.

FIG. 18 illustrates an example radio network controller or core network node 1800, in accordance with certain embodiments. Examples of network nodes can include a mobile switching center (MSC), a serving GPRS support node (SGSN), a mobility management entity (MME), a radio network controller (RNC), a base station controller (BSC), and so on. The radio network controller or core network node includes processing circuitry 1820 (e.g., which may include one or more processors), memory 1830, and network interface 1840. In some embodiments, processing circuitry 1820 executes instructions to provide some or all of the functionality described above as being provided by the network node, memory 1830 stores the instructions executed by processing circuitry 1820, and network interface 1840 communicates signals to any suitable node, such as a gateway, switch, router, Internet, Public Switched Telephone Network (PSTN), network nodes 315, radio network controllers or core network nodes, etc.

Processing circuitry 1820 may include any suitable combination of hardware and software implemented in one or more modules to execute instructions and manipulate data to perform some or all of the described functions of the radio network controller or core network node. In some embodiments, processing circuitry 1820 may include, for example, one or more computers, one or more central processing units (CPUs), one or more microprocessors, one or more applications, and/or other logic.

Memory 1830 is generally operable to store instructions, such as a computer program, software, an application including one or more of logic, rules, algorithms, code, tables, etc. and/or other instructions capable of being executed by a processor. Examples of memory 1830 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 1840 is communicatively coupled to processing circuitry 1820 and may refer to any suitable device operable to receive input for the network node, send output from the network node, perform suitable processing of the input or output or both, communicate to other devices, or any combination of the preceding. Network interface 1840 may include appropriate hardware (e.g., port, modem, network interface card, etc.) and software, including protocol conversion and data processing capabilities, to communicate through a network.

Other embodiments of the network node may include additional components beyond those shown in FIG. 18 that may be responsible for providing certain aspects of the network node's functionality, including any of the functionality described above and/or any additional functionality (including any functionality necessary to support the solution described above).

Figure 19:
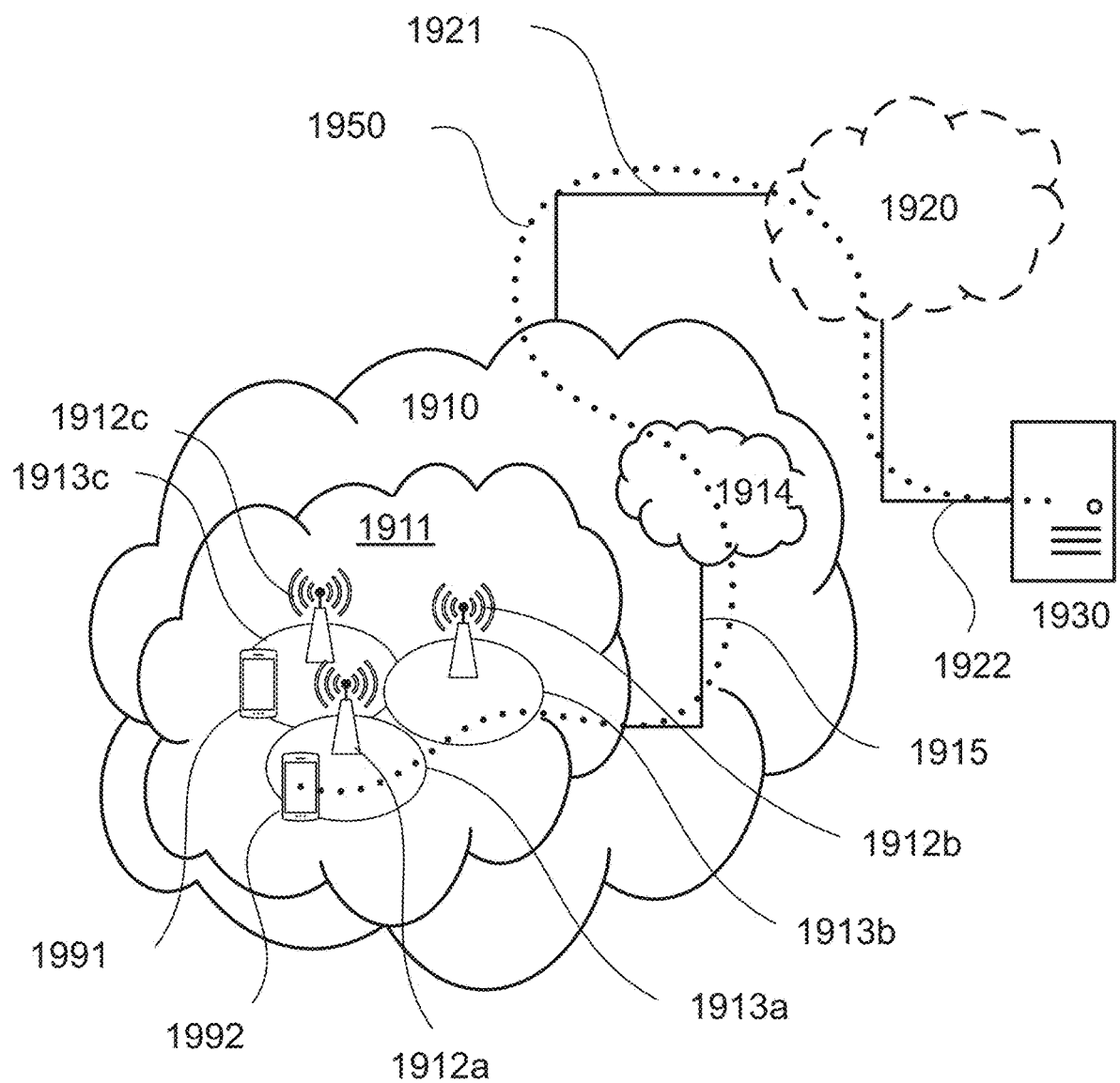
FIG. 19 illustrates a communication system, in accordance with certain embodiments.

With reference to FIG. 19, in accordance with an embodiment, a communication system includes a telecommunication network 1910, such as a 3GPP-type cellular network, which comprises an access network 1911, such as a radio access network, and a core network 1914. The access network 1911 comprises a plurality of base stations 1912*a*, 1912*b*, 1912*c*, such as NBs, eNBs, gNBs or other types of wireless access points, each defining a corresponding coverage area 1913*a*, 1913*b*, 1913*c*. Each base station 1912*a*, 1912*b*, 1912*c* is connectable to the core network 1914 over a wired or wireless connection 1915. A first user equipment (UE) 1991 located in coverage area 1913*c* is configured to wirelessly connect to, or be paged by, the corresponding base station 1912*c*. A second UE 1992 in coverage area 1913*a* is wirelessly connectable to the corresponding base station 1912*a*. While a plurality of UEs 1991, 1992 are illustrated in this example, the disclosed embodiments are equally applicable to a situation where a sole UE is in the coverage area or where a sole UE is connecting to the corresponding base station 1912.

The telecommunication network 1910 is itself connected to a host computer 1930, which may be embodied in the hardware and/or software of a standalone server, a cloud-implemented server, a distributed server or as processing resources in a server farm. The host computer 1930 may be under the ownership or control of a service provider, or may be operated by the service provider or on behalf of the service provider. The connections 1921, 1922 between the telecommunication network 1910 and the host computer 1930 may extend directly from the core network 1914 to the host computer 1930 or may go via an optional intermediate network 1920. The intermediate network 1920 may be one of, or a combination of more than one of, a public, private or hosted network; the intermediate network 1920, if any, may be a backbone network or the Internet; in particular, the intermediate network 1920 may comprise two or more sub-networks (not shown).

The communication system of FIG. 19 as a whole enables connectivity between one of the connected UEs 1991, 1992 and the host computer 1930. The connectivity may be described as an over-the-top (OTT) connection 1950. The host computer 19230 and the connected UEs 1991, 1992 are configured to communicate data and/or signaling via the OTT connection 1950, using the access network 1911, the core network 1914, any intermediate network 1920 and possible further infrastructure (not shown) as intermediaries. The OTT connection 1950 may be transparent in the sense that the participating communication devices through which the OTT connection 1950 passes are unaware of routing of uplink and downlink communications. For example, a base station 912 may not or need not be informed about the past routing of an incoming downlink communication with data originating from a host computer 1930 to be forwarded (e.g., handed over) to a connected UE 1991. Similarly, the base station 1912 need not be aware of the future routing of an outgoing uplink communication originating from the UE 1991 towards the host computer 1930.

Example implementations, in accordance with an embodiment, of the UE, base station and host computer discussed in the preceding paragraphs will now be described with reference to FIG. 20. In a communication system 2000, a host computer 2010 comprises hardware 2015 including a communication interface 2016 configured to set up and maintain a wired or wireless connection with an interface of a different communication device of the communication system 2000. The host computer 2010 further comprises processing circuitry 2018, which may have storage and/or processing capabilities. In particular, the processing circuitry 2018 may comprise one or more programmable processors, application-specific integrated circuits, field programmable gate arrays or combinations of these (not shown) adapted to execute instructions. The host computer 2010 further comprises software 2011, which is stored in or accessible by the host computer 2010 and executable by the processing circuitry 2018. The software 2011 includes a host application 2012. The host application 2012 may be operable to provide a service to a remote user, such as a UE 2030 connecting via an OTT connection 2050 terminating at the UE 2030 and the host computer 2010. In providing the service to the remote user, the host application 2012 may provide user data which is transmitted using the OTT connection 2050.

The communication system 2000 further includes a base station 2020 provided in a telecommunication system and comprising hardware 2025 enabling it to communicate with the host computer 2010 and with the UE 2030. The hardware 2025 may include a communication interface 2026 for setting up and maintaining a wired or wireless connection with an interface of a different communication device of the communication system 2000, as well as a radio interface 2027 for setting up and maintaining at least a wireless connection 2070 with a UE 2030 located in a coverage area (not shown in FIG. 20) served by the base station 2020. The communication interface 2026 may be configured to facilitate a connection 2060 to the host computer 2010. The connection 2060 may be direct or it may pass through a core network (not shown in FIG. 20) of the telecommunication system and/or through one or more intermediate networks outside the telecommunication system. In the embodiment shown, the hardware 2025 of the base station 2020 further includes processing circuitry 2027, which may comprise one or more programmable processors, application-specific integrated circuits, field programmable gate arrays or combinations of these (not shown) adapted to execute instructions. The base station 2020 further has software 2021 stored internally or accessible via an external connection.

The communication system 2000 further includes the UE 2030 already referred to. Its hardware 2035 may include a radio interface 2037 configured to set up and maintain a wireless connection 2070 with a base station serving a coverage area in which the UE 2030 is currently located. The hardware 2035 of the UE 2030 further includes processing circuitry 2038, which may comprise one or more programmable processors, application-specific integrated circuits, field programmable gate arrays or combinations of these (not shown) adapted to execute instructions. The UE 2030 further comprises software 2031, which is stored in or accessible by the UE 2030 and executable by the processing circuitry 2038. The software 2031 includes a client application 2032. The client application 2032 may be operable to provide a service to a human or non-human user via the UE 2030, with the support of the host computer 2010. In the host computer 2010, an executing host application 2012 may communicate with the executing client application 2032 via the OTT connection 2050 terminating at the UE 2030 and the host computer 2010. In providing the service to the user, the client application 2032 may receive request data from the host application 2012 and provide user data in response to the request data. The OTT connection 2050 may transfer both the request data and the user data. The client application 2032 may interact with the user to generate the user data that it provides.

Figure 20:
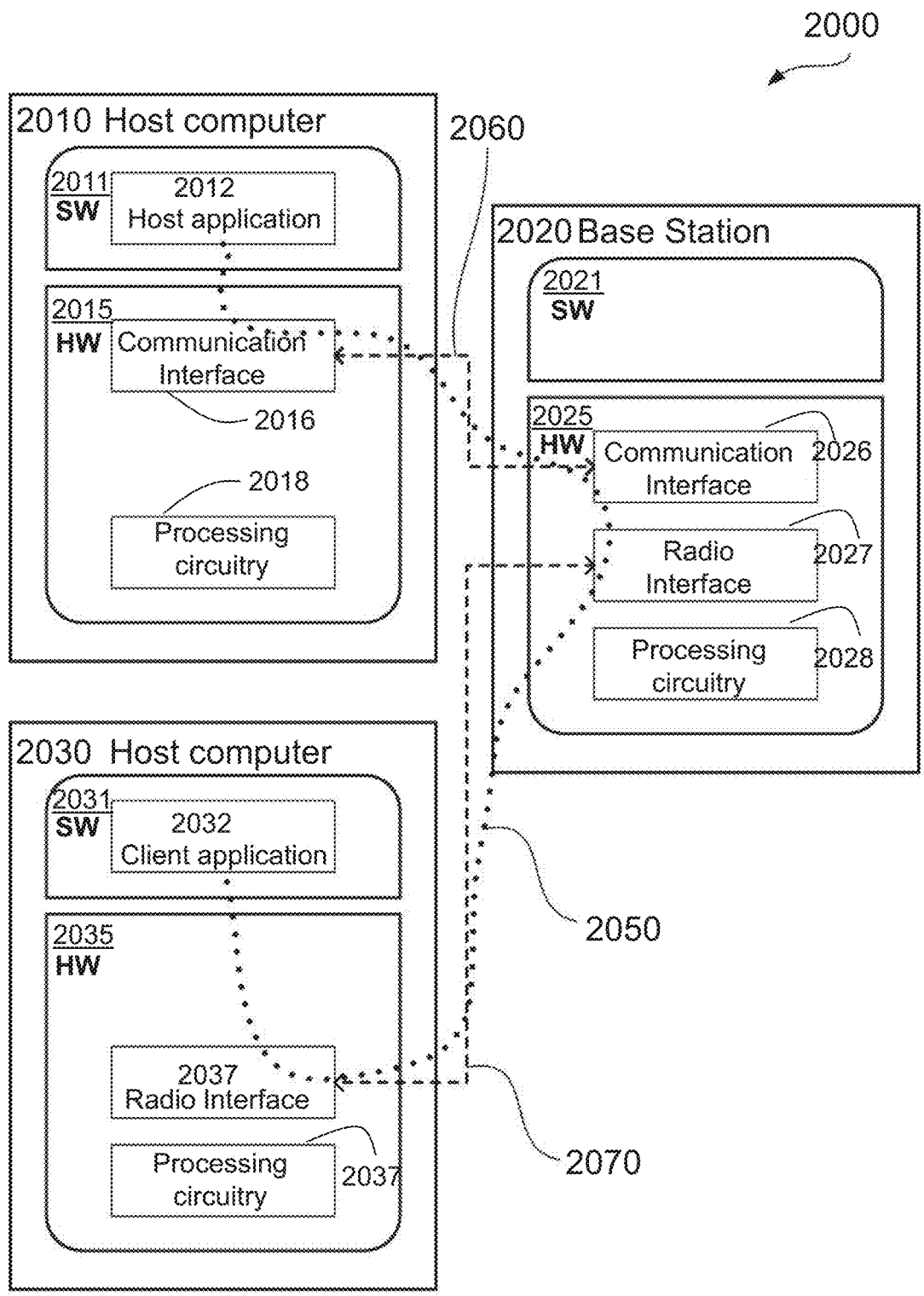
FIG. 20 illustrates a UE, base station and host computer, in accordance with certain embodiments.

It is noted that the host computer 2010, base station 2020 and UE 2030 illustrated in FIG. 20 may be identical to the host computer 1930, one of the base stations 1922*a*, 1912*b*, 1912*c* and one of the UEs 1991, 1992 of FIG. 19, respectively. This is to say, the inner workings of these entities may be as shown in FIG. 20 and independently, the surrounding network topology may be that of FIG. 19.

In FIG. 20, the OTT connection 2050 has been drawn abstractly to illustrate the communication between the host computer 2010 and the use equipment 2030 via the base station 2020, without explicit reference to any intermediary devices and the precise routing of messages via these devices. Network infrastructure may determine the routing, which it may be configured to hide from the UE 2030 or from the service provider operating the host computer 2010, or both. While the OTT connection 2050 is active, the network infrastructure may further take decisions by which it dynamically changes the routing (e.g., on the basis of load balancing consideration or reconfiguration of the network).

The wireless connection 2070 between the UE 2030 and the base station 2020 is in accordance with the teachings of the embodiments described throughout this disclosure. One or more of the various embodiments improve the performance of OTT services provided to the UE 2030 using the OTT connection 2050, in which the wireless connection 2070 forms the last segment. More precisely, the teachings of these embodiments may improve roaming by UEs and thereby provide benefits such as reduced user waiting time and better responsiveness.

A measurement procedure may be provided for the purpose of monitoring data rate, latency and other factors on which the one or more embodiments improve. There may further be an optional network functionality for reconfiguring the OTT connection 2050 between the host computer 2010 and UE 2030, in response to variations in the measurement results. The measurement procedure and/or the network functionality for reconfiguring the OTT connection 2050 may be implemented in the software 2011 of the host computer 2010 or in the software 2031 of the UE 2030, or both. In embodiments, sensors (not shown) may be deployed in or in association with communication devices through which the OTT connection 2050 passes; the sensors may participate in the measurement procedure by supplying values of the monitored quantities exemplified above, or supplying values of other physical quantities from which software 2011, 2031 may compute or estimate the monitored quantities. The reconfiguring of the OTT connection 2050 may include message format, retransmission settings, preferred routing etc.; the reconfiguring need not affect the base station 2020, and it may be unknown or imperceptible to the base station 2020. Such procedures and functionalities may be known and practiced in the art. In certain embodiments, measurements may involve proprietary UE signaling facilitating the host computer's 2010 measurements of throughput, propagation times, latency and the like. The measurements may be implemented in that the software 2011, 2031 causes messages to be transmitted, in particular empty or 'dummy' messages, using the OTT connection 2050 while it monitors propagation times, errors etc.

FIG. 21 is a flowchart illustrating a method implemented in a communication system, in accordance with one embodiment. The communication system includes a host computer, a base station and a UE which may be those described with reference to FIGS. 19 and 20. For simplicity of the present disclosure, only drawing references to FIG. 21 will be included in this section. In a first step 2110 of the method, the host computer provides user data. In an optional substep 2111 of the first step 2110, the host computer provides the user data by executing a host application. In a second step 2120, the host computer initiates a transmission carrying the user data to the UE. In an optional third step 2130, the base station transmits to the UE the user data which was carried in the transmission that the host computer initiated, in accordance with the teachings of the embodiments described throughout this disclosure. In an optional fourth step 2140, the UE executes a client application associated with the host application executed by the host computer.

FIG. 22 is a flowchart illustrating a method implemented in a communication system, in accordance with one embodiment. The communication system includes a host computer, a base station and a UE which may be those described with reference to FIGS. 19 and 20. For simplicity of the present disclosure, only drawing references to FIG. 22 will be included in this section. In a first step 2210 of the method, the host computer provides user data. In an optional substep (not shown) the host computer provides the user data by executing a host application. In a second step 2220, the host computer initiates a transmission carrying the user data to the UE. The transmission may pass via the base station, in accordance with the teachings of the embodiments described throughout this disclosure. In an optional third step 2230, the UE receives the user data carried in the transmission.

FIG. 23 is a flowchart illustrating a method implemented in a communication system, in accordance with one embodiment. The communication system includes a host computer, a base station and a UE which may be those described with reference to FIGS. 19 and 20. For simplicity of the present disclosure, only drawing references to FIG. 23 will be included in this section. In an optional first step 2310 of the method, the UE receives input data provided by the host computer. Additionally or alternatively, in an optional second step 2320, the UE provides user data. In an optional substep 2321 of the second step 2320, the UE provides the user data by executing a client application. In a further optional substep 2311 of the first step 2310, the UE executes a client application which provides the user data in reaction to the received input data provided by the host computer. In providing the user data, the executed client application may further consider user input received from the user. Regardless of the specific manner in which the user data was provided, the UE initiates, in an optional third substep 2330, transmission of the user data to the host computer. In a fourth step 2340 of the method, the host computer receives the user data transmitted from the UE, in accordance with the teachings of the embodiments described throughout this disclosure.

FIG. 24 is a flowchart illustrating a method implemented in a communication system, in accordance with one embodiment. The communication system includes a host computer, a base station and a UE which may be those described with reference to FIGS. 19 and 20. For simplicity of the present disclosure, only drawing references to FIG. 24 will be included in this section. In an optional first step 2410 of the method, in accordance with the teachings of the embodiments described throughout this disclosure, the base station receives user data from the UE. In an optional second step 2420, the base station initiates transmission of the received user data to the host computer. In a third step 2430, the host computer receives the user data carried in the transmission initiated by the base station.

Example Embodiments

1. A method by a wireless device for securing network steering information, comprises:
   transmitting a registration request to a Visited Public Land Mobile Network (VPLMN);
   upon successful authentication by an authentication server function (AUSF), generating a home network root key;
   receiving, from a network node, a protected message comprising Network Steering Information, which is protected using a configuration key (Kconf) derived from the home network root key and a first Message Authentication Code (MAC-1);
   deriving the configuration key (Kconf) from the home network rook key;
   verifying, by the UE, the MAC-1;
   based on the Kconf and the MAC-1, verifying that the VPLMN did not alter Network Steering Information; and
   transmitting an acknowledgement message to a Home Public Land Mobile Network (HPLMN), the acknowledgement message protected with a second Message Authenticaiton Code (MAC-2).

2. The method of example embodiment 1, wherein the home network root key is a Kausf.

3. The method of example embodiments 1 to 2, wherein the network node comprises the AUSF.

4. The method of example embodiments 1 to 3, wherein the Network Steering Information is generated by another network node and protected by the AUSF.

5. The method of any of example embodiment 4, wherein the Network Steering Information is generated by User Data Management (UDM).

6. The method of any of example embodiments 1 to 2, wherein the network node comprises a Point Coordination Function (PCF) responsible for protecting the Network Steering Information in the protected message.

7. The method of any of example embodiments 1 to 2, wherein the network node comprises an Access Mobility Function/Security Anchor Function (AMF/SEAF), which forwarded the protected message comprising the Network Steering Information from another network node.

8. The method of example embodiment 7, wherein the protected message is confidentiality protected over the air with Non Access Stratum (NAS) security.

9. The method of any of example embodiments 1 to 8, wherein the protected message is piggybacked with a Registration Accept message.

10. A user equipment (UE) comprising memory operable to store instructions and processing circuitry operable to execute the instructions, whereby the network node is operable to perform any of the methods of example embodiments 1 to 9.

11. A computer program product comprising a non-transitory computer readable medium storing computer readable program code, the computer readable program code comprises program code for performing any of the methods of example embodiments 1 to 9.

12. A method for securing network steering information by a network node operating as an authentication server function (AUSF), the method comprises:
   generating a home network root key;
   receiving Network Steering Information from a Point Coordination Function (PCF);
   deriving a configuration key (Kconf) from the home network key;
   generating a protected message comprising the Network Steering Information, the protected message being protected using the Kconf and a first Message Authentication Code (MAC-1);
   transmitting the protected message comprising the Network Steering Information to a user equipment (UE);
   receiving, from the UE, an acknowledgement message protected with a second Message Authentication Code (MAC-2), the acknowledgment indicating that the VPLMN did not alter the Network Steering Information;
   verifying the MAC-2; and
   forwarding the acknowledgment message indicating that the VPLMN did not alter the Network Steering Information to the PCF.

13. The method of embodiment 12, wherein the home network root key is a Kausf.

14. The method of embodiments 12 to 13, wherein the protected message is piggybacked with a Registration Accept message.

15. A network node comprising memory operable to store instructions and processing circuitry operable to execute the instructions, whereby the network node is operable to perform any of the methods of example embodiments 12 to 14.

16. A computer program product comprising a non-transitory computer readable medium storing computer readable program code, the computer readable program code comprises program code for performing any of the methods of example embodiments 12 to 14.

17. A method for securing network steering information by a network node operating as a Point Coordination Function (PCF), the method comprising:
   requesting, from a Authentication Server Function (ASF), a configuration key (KConf) derived from a home network root key;

receiving the KConf;
generating a protected message comprising Network Steering Information, the protected message being protected using the Kconf and a first Message Authentication Code (MAC-1);
transmitting the protected message comprising the Network Steering Information to a user equipment (UE);
receiving, from the UE, an acknowledgement message protected with a second Message Authentication Code (MAC-2), the acknowledgment indicating that the VPLMN did not alter the Network Steering Information;
verifying the MAC-2; and
determining based on the acknowledgement that the VPLMN did not alter the Network Steering Information.

18. The method of embodiment 17, wherein the home network root key is a Kaust.

19. The method of embodiments 17 to 18, wherein the protected message is piggybacked with a Registration Accept message.

20. A network node comprising memory operable to store instructions and processing circuitry operable to execute the instructions, whereby the network node is operable to perform any of the methods of example embodiments 17 to 19.

21. A computer program product comprising a non-transitory computer readable medium storing computer readable program code, the computer readable program code comprises program code for performing any of the methods of example embodiments 17 to 19.

22. A base station configured to communicate with a user equipment (UE), the base station comprising a radio interface and processing circuitry configured to perform any of the methods of example embodiments 17 to 19.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure.

ABBREVIATIONS

| Abbreviation | Explanation |
| --- | --- |
| 3GPP | 3$^{rd}$ Generation Partnership Project |
| 5G | 5$^{th}$ Generation |
| BER | Bit Error Rate |
| C-MTC | Critical MTC (Ako referred to as Ultra Reliable and Low Latency Communication (URLLC).) |
| CP | Cyclic Prefix |
| DMRS | Demodulation Reference Signal |
| eNB | Evolved NodeB |
| gNB | The term for a radio base station in NR (corresponding to eNB in LTE) |
| ID | Identity/Identifier |
| IE | Information Element |
| IM | Index Modulation |
| LTE | Long Term Evolution |
| MIB | Master Information Block |
| MIMO | Multiple-Input Multiple-Output |
| ML | Maximum Likelihood Detection |
| MSG | Message |
| M-MTC | Massive MTC |
| MTC | Machine Type Communication |
| NGC | Next Generation Core |
| NR | New Radio (The term used for the 5G radio interface and radio access network in the technical reports and standard specifications 3GPP are working on.) |
| OFDM | Orthogonal Frequency Division Multiple Access |
| PBCH | Physical Broadcast Channel |
| PCI | Physical Cell Identity |
| PDCCH | Physical Downlink Control Channel |
| PDSCH | Physical Downlink Shared Channel |
| PLMN | Public Land Mobile Network |
| PRACH | Physical Random Access Channel |
| PSS | Primary Synchronization Signal |
| QAM | Quadrature Amplitude Modulation |
| QCL | Quasi-Co-Located |
| RA | Random Access |
| RAN | Random Access Network |
| RAR | Random Access Response |
| RMSI | Remaining Minimum System Information |
| RRC | Radio Resource Control |
| SFN | Single Frequency Network |
| SI | System Information |
| SIB | System Information Block |
| SM | Spatial Modulation |
| SNR | Signal to Noise Ratio |
| SS | Synchronization Signal |
| SSS | Secondary Synchronization Signal |
| TRP | Transmission/Reception Point |
| UE | User Equipment |
| UL | Uplink |

The invention claimed is:

1. A method performed by a user equipment (UE) for securing network steering information, comprises:
transmitting a registration request to a Visited Public Land Mobile Network (VPLMN);
upon successful primary authentication, generating a home network root key;
receiving, from a first network node, a protected message comprising Network Steering Information, which is protected using the home network root key and a first Message Authentication Code (MAC-1);
based on the home network root key and a verified MAC-1, determining that the VPLMN did not alter Network Steering Information; and
transmitting an acknowledgement message to a Home Public Land Mobile Network (HPLMN), wherein the acknowledgement message is transmitted with a second Message Authentication Code (MAC-2).

2. The method of claim 1, wherein the home network root key is an authentication server function key (Kausf) and the first network node comprises an authentication server function (AUSF).

3. The method of claim 1, wherein the Network Steering Information is generated by a second network node and protected by the AUSF.

4. The method of claim 1, wherein the Network Steering Information is generated by User Data Management (UDM).

5. The method of claim 1, wherein the protected message is piggybacked with a Registration Accept message.

6. A user equipment (UE) comprising:
memory configured to store instructions; and
processing circuitry configured to execute the instructions to cause the UE to:
transmit a registration request to a Visited Public Land Mobile Network (VPLMN);
upon successful primary authentication, generate a home network root key;
receive, from a first network node, a protected message comprising Network Steering Information, which is protected using the home network root key and a first Message Authentication Code (MAC-1);
based on the home network root key and a verified MAC-1, determine that the VPLMN did not alter Network Steering Information; and
transmit an acknowledgement message to a Home Public Land Mobile Network (HPLMN), wherein the acknowledgement message is transmitted with a second Message Authentication Code (MAC-2).

7. The UE of claim 6, wherein the home network root key is an authentication server function key (Kausf) and the first network node comprises an authentication server function (AUSF).

8. The UE of claim 7, wherein the Network Steering Information is generated by a second network node and protected by the AUSF.

9. The UE of claim 8, wherein the Network Steering Information is generated by User Data Management (UDM).

10. The UE of claim 6, wherein the protected message is piggybacked with a Registration Accept message.

11. A method for securing network steering information by a first network node operating as an authentication server function (AUSF), the method comprises:
generating a home network root key;
receiving Network Steering Information from a second network node;
generating a protected message comprising the Network Steering Information, the protected message being protected using the home network root key and a first Message Authentication Code (MAC-1);
transmitting the protected message comprising the Network Steering Information to a user equipment (UE);
receiving, from the UE, an acknowledgement message protected with a second Message Authentication Code (MAC-2), the acknowledgment indicating that the VPLMN did not alter the Network Steering Information; and
forwarding the acknowledgment message indicating that the VPLMN did not alter the Network Steering Information to the second network node.

12. The method of claim 11, wherein the home network root key is an AUSF key (Kausf) and the protected message is piggybacked with a Registration Accept message.

13. The method of claim 11, wherein the second network node is operating as at least one of a Point Coordination Function (PCF) or a User data Management (UDM).

14. A first network node operating as an authentication server function (AUSF) for securing network steering information, the network node comprising:
memory configured to store instructions; and
processing circuitry configured to execute the instructions to cause the network node to:
generate a home network root key;
receive Network Steering Information from a second network node;
generate a protected message comprising the Network Steering Information, the protected message being protected using the home network root key and a first Message Authentication Code (MAC-1);
transmit the protected message comprising the Network Steering Information to a user equipment (UE);
receive, from the UE, an acknowledgement message protected with a second Message Authentication Code (MAC-2), the acknowledgment indicating that the VPLMN did not alter the Network Steering Information; and
forward the acknowledgment message indicating that the VPLMN did not alter the Network Steering Information to the second network node.

15. The first network node of claim 14, wherein the home network root key is an AUSF key (Kausf).

16. The first network node of claim 14 wherein the protected message is piggybacked with a Registration Accept message.

17. The first network node of claim 14, the second network node is operating as at least one of a Point Coordination Function (PCF) or a User data Management (UDM).

18. A method for securing network steering information by a first network node, the method comprising:
transmitting Network Steering Information and a first Message Altercation Code (MAC-1) to a second network node operating as an authentication server function (AUSF) for protection of the Network Steering Information using a home network root key and the first Message Authentication Code (MAC-1);
receiving, from the UE, an acknowledgement message protected with a second Message Authentication Code (MAC-2), the acknowledgment indicating that the VPLMN did not alter the Network Steering Information;
verifying the MAC-2; and
determining based on the acknowledgement that the VPLMN did not alter the Network Steering Information.

19. The method of claim 18, wherein the home network root key is an AUSF key (Kausf).

20. The method of claim 18, wherein the first network node operates as a User Data Management (UDM) or a Point Coordination Function (PCF).

21. The method of claim 18, further comprising:
receiving from the second network node operating as the AUSF, the MAC-1 and the MAC-2;
storing the MAC-2.

22. The method of claim 21, wherein:
verifying the MAC-2 comprises comparing the MAC-2 received from the second network node operating as the AUSF to the MAC-2 protecting the acknowledgment message from the UE, and
determining based on the acknowledgement that the VPLMN did not alter the Network Steering Information comprises determining that the MAC-2 received from the second network node operating as the AUSF is the same as the MAC-2 protecting the acknowledgment message from the UE.

23. A first network node for securing network steering information, the network node comprising:
memory configured to store instructions; and
processing circuitry configured to execute the instructions to cause the network node to:

transmit Network Steering Information and a first Message Altercation Code (MAC-1) to a second network node operating as an authentication server function (AUSF) for protection of the Network Steering Information using a home network root key and the first Message Authentication Code (MAC-1);

receive, from the UE, an acknowledgement message protected with a second Message Authentication Code (MAC-2), the acknowledgment indicating that the VPLMN did not alter the Network Steering Information;

verify the MAC-2; and determine based on the acknowledgement that the VPLMN did not alter the Network Steering Information.

24. The first network node of claim 23, wherein the home network root key is an AUSF key (Kausf).

25. The first network node of claim 23, wherein the first network node operates as a User Data Management (UDM) or a Point Coordination Function (PCF).

26. The first network node of claim 23, wherein the processing circuitry is configured to:

receive from the second network node operating as the AUSF, the MAC-1 and the MAC-2;

store the MAC-2.

27. The first network node of claim 26, wherein:

verifying the MAC-2 comprises comparing the MAC-2 received from the second network node operating as the AUSF to the MAC-2 protecting the acknowledgment message from the UE, and determining based on the acknowledgement that the VPLMN did not alter the Network Steering Information comprises determining that the MAC-2 received from the second network node operating as the AUSF is the same as the MAC-2 protecting the acknowledgment message from the UE.

* * * * *

UNITED STATES PATENT AND TRADEMARK OFFICE
CERTIFICATE OF CORRECTION

PATENT NO. : 12,273,714 B2
APPLICATION NO. : 18/528662
DATED : April 8, 2025
INVENTOR(S) : Vesa Torvinen et al.

Page 1 of 1

It is certified that error appears in the above-identified patent and that said Letters Patent is hereby corrected as shown below:

In the Claims

In Column 30, Line 29 in Claim 18, delete "Message Altercation Code" and insert --Message Authentication Code--, therefor.

In Column 31, Line 2 in Claim 23, delete "Message Altercation Code" and insert --Message Authentication Code--, therefor.

Signed and Sealed this
Sixth Day of May, 2025

Coke Morgan Stewart
*Acting Director of the United States Patent and Trademark Office*